(12) United States Patent
Kannan et al.

(10) Patent No.: US 9,055,588 B2
(45) Date of Patent: Jun. 9, 2015

(54) METHODS AND APPARATUS FOR IDENTIFYING AND/OR SELECTING CHANNELS

(75) Inventors: Sreeram Kannan, Champaign, IL (US); Ahmed K. Sadek, San Diego, CA (US); Stephen J. Shellhammer, Ramona, CA (US); Saurabh Tavildar, Jersey City, NJ (US); Nilesh Khude, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 111 days.

(21) Appl. No.: 13/226,101

(22) Filed: Sep. 6, 2011

(65) Prior Publication Data

US 2013/0059614 A1     Mar. 7, 2013

(51) Int. Cl.
*H04B 7/00* (2006.01)
*H04W 72/00* (2009.01)
*H04W 72/06* (2009.01)
*H04W 8/00* (2009.01)

(52) U.S. Cl.
CPC .............. *H04W 72/06* (2013.01); *H04W 8/005* (2013.01)

(58) Field of Classification Search
CPC ..... H04W 72/06; H04W 8/005; H04W 72/02; H04W 24/10
USPC ......... 455/432–439, 444, 450–453, 509, 512, 455/515, 41.2; 370/330, 350
See application file for complete search history.

(56) References Cited

U.S. PATENT DOCUMENTS 5,697,077 A * 12/1997 Saitoh ........................ 455/186.1
7,539,507 B2    5/2009 Grob et al.
7,634,269 B2   12/2009 Gallagher
2007/0225044 A1 * 9/2007 Law et al. ................... 455/562.1
2010/0124254 A1    5/2010 Wu et al.
2010/0246506 A1    9/2010 Krishnaswamy
2010/0254308 A1 * 10/2010 Laroia et al. ................. 370/328

(Continued)

FOREIGN PATENT DOCUMENTS

| JP | 2013520938 A | 6/2013 |
| WO | WO-05053253 | 6/2005 |
| WO | WO-2011106538 A1 | 9/2011 |

OTHER PUBLICATIONS

International Search Report and Written Opinion—PCT/US2012/053978—ISA/EPO—Jan. 7, 2013.

*Primary Examiner* — Yuwen Pan
*Assistant Examiner* — Xin Jia
(74) *Attorney, Agent, or Firm* — James K. O'Hare

(57) ABSTRACT

A decentralized approach to peer discovery channel selection is used in some embodiments. In some such embodiments, a mobile wireless terminal supporting a peer to peer signaling protocol, independently determines what channels to use for peer discovery without a central controller indicating the channel or channels to be used. Assuming channels are of a suitable quality, the channels having the best quality need not be identified, with channel selection being made on a predetermined channel ordering basis from those with suitable quality. Different wireless communications devices in the system use the same peer discovery channel selection process making it likely that the same channel or channels will tend to be picked to be used for peer discovery. Other embodiments are directed to implementing a centralized approach to peer discovery channel selection in which a central controller or base station selects channels to be used for peer discovery signaling.

15 Claims, 15 Drawing Sheets

(56) References Cited

U.S. PATENT DOCUMENTS

| | | |
|---|---|---|
| 2010/0255794 A1 | 10/2010 | Agnew |
| 2010/0291872 A1 | 11/2010 | Laroia et al. |
| 2011/0085455 A1* | 4/2011 | Wu et al. ............... 370/252 |
| 2011/0149759 A1* | 6/2011 | Jollota ............... 370/252 |
| 2012/0054278 A1* | 3/2012 | Taleb et al. ............... 709/204 |

* cited by examiner

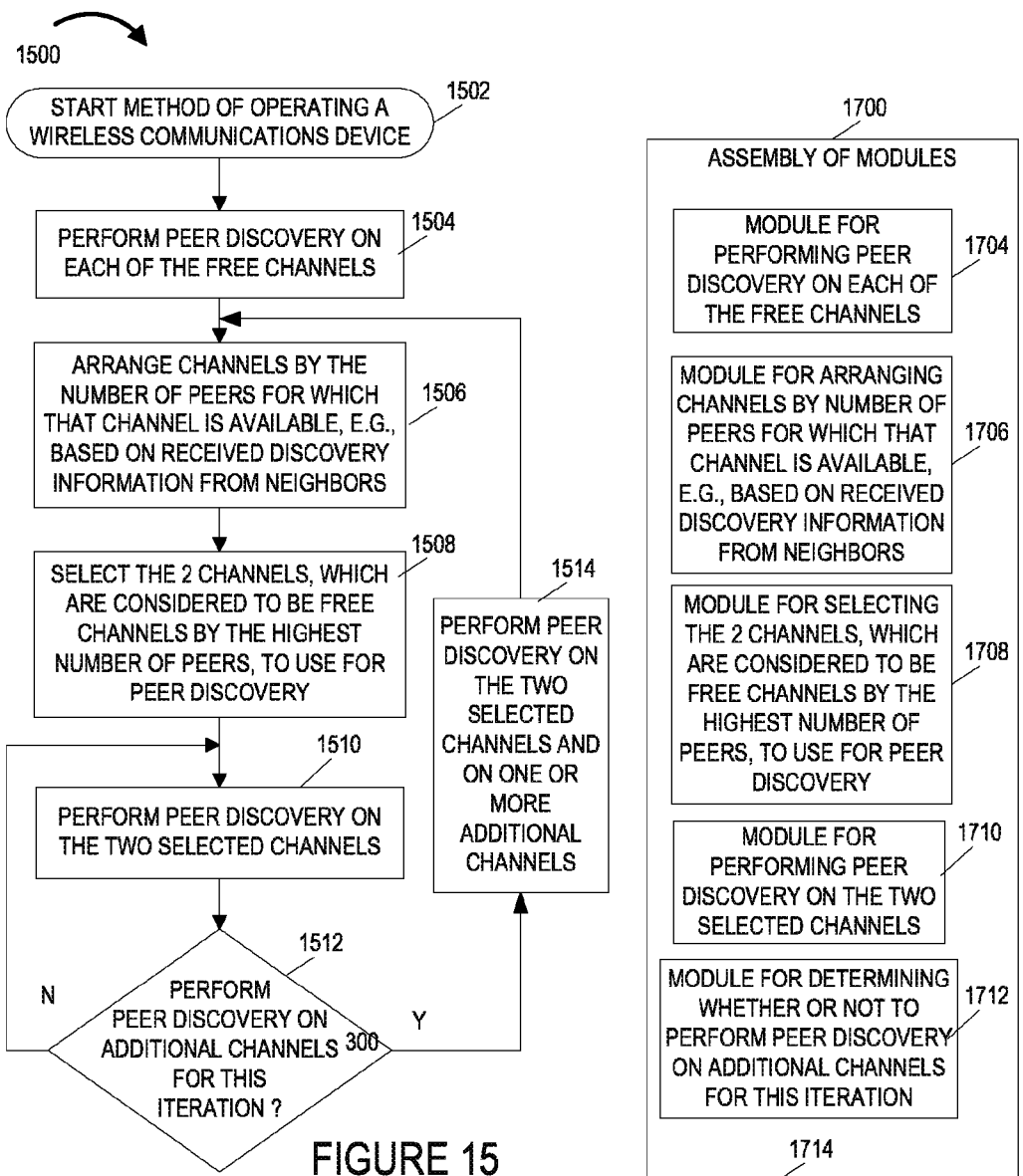
FIGURE 15
FIGURE 17
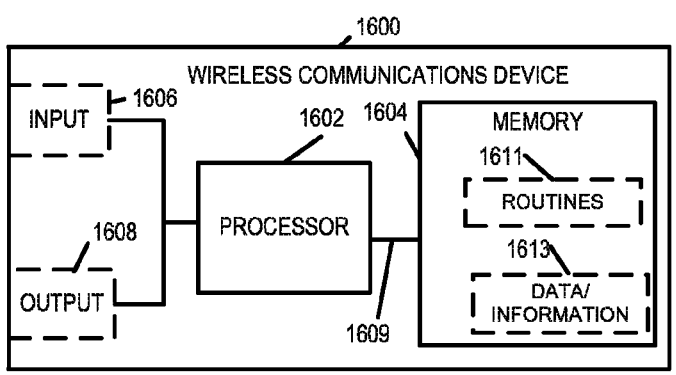
FIGURE 16

METHODS AND APPARATUS FOR IDENTIFYING AND/OR SELECTING CHANNELS

FIELD

Various embodiments are directed to the channel selection, and more particularly, to the selection of a channel or channels to use for peer discovery signaling in a peer to peer wireless communications system.

BACKGROUND

A communication network operating over unlicensed bands or operating over TV white space frequencies is different from deployments using licensed bands. When using unlicensed bands or TV white space, the same channel may not be available at all locations because of the presence of a primary user which has priority with regard to spectrum use. For example a TV signal or wireless microphone in TV white space may be present at some locations but not at other locations. In addition, with unlicensed bands and TV white space, the same channel can be, and sometimes is, shared by various devices using disparate technologies creating an interference pattern that changes spatially and temporally.

A wireless communications device which wants to utilize one or more unlicensed bands or TV white space for peer to peer communications may have a large number of potential communications channels available. It is desirable that a wireless communications device be able to quickly and efficiently discover other peer devices and be discoverable by other peer devices in its local vicinity. A wireless communications device could simply transmit peer discovery information and monitor for peer discovery information on each of a plurality of available channels. However, such an approach tends to utilize a lot of resources, e.g., time/frequency air link resources and/or battery power which could otherwise be used for better purposes such as for communicating peer to peer traffic data over a traffic channel.

In view of the above, there is a need for new and/or improved methods and apparatus for selecting discovery channels in peer to peer communications system.

SUMMARY

Some embodiments are directed to methods and apparatus for implementing a decentralized approach to peer discovery channel selection in a peer to peer wireless communications system. In some such embodiments, a wireless communications device, e.g., a mobile wireless terminal supporting a peer to peer signaling protocol, independently determines what channel or channels to use for peer discovery signaling without a central controller indicating the channel or channels to be used. In some embodiments, assuming channels are of a suitable quality, the channels having the best quality need not be identified. In some embodiments, channel selection is made, taking into consideration channels with adequate quality, on a predetermined channel ordering basis, e.g., alphabetically based on channel name or numerically based on predetermined channel numbers. Different wireless communications devices in the system use the same peer discovery channel selection process making it likely that the same channel or channels, but not necessarily the channels having the best communications quality, will tend to be picked to be used for peer discovery.

An exemplary method of operating a wireless communication device, in some embodiments, comprises: identifying communications channels which are available for peer discovery use; ordering the channels identified as being available for use according to a predetermined ordering scheme; and selecting one or more of said identified communications channels from the ordered channels to be used for peer discovery signaling, said selecting being performed as a function of the channel ordering. A wireless communications device, in some embodiments, comprises: at least one processor configured to: identify communications channels which are available for peer discovery use; order the channels identified as being available for use according to a predetermined ordering scheme; and select one or more of said identified communications channels from the ordered channels to be used for peer discovery signaling, said selecting being performed as a function of the channel ordering. The wireless communications device further includes memory coupled to said at least one processor.

Some embodiments are directed to methods and apparatus for implementing a centralized approach to peer discovery channel selection in a peer to peer wireless communications system. In some embodiments, a local node, e.g., a base station, an access node or a location anchor point node, selects the channels or channels to be used for peer discovery signaling in its local region. In some other embodiments, a central controller selects the channels or channels to be used for peer discovery signaling in a plurality of different regions.

A method of operating a node in a peer to peer communications system, in accordance with some embodiments, comprises: determining channel usage by a plurality of peer to peer devices, said channel usage indicating usage of one or more channels for peer discovery; and selecting at least one channel for use as a peer discovery channel, said selecting being performed as a function of the number of peer to peer devices already using individual channels for peer discovery. An exemplary node, in accordance with some embodiments, comprises: at least one processor configured to: determine channel usage by a plurality of peer to peer devices, said channel usage indicating usage of one or more channels for peer discovery; and select at least one channel for use as a peer discovery channel, said selecting being performed as a function of the number of peer to peer devices already using individual channels for peer discovery. The exemplary node further comprises memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 15 is a flowchart of an exemplary method of operating a wireless communications device, e.g., a peer to peer communications device, in accordance with various exemplary embodiments.

FIG. 16 is a drawing of an exemplary wireless communications device in accordance with an exemplary embodiment.

FIG. 17 is an assembly of modules which can, and in some embodiments is, used in the exemplary wireless communications device illustrated in FIG. 16.

DETAILED DESCRIPTION

Figure 1:
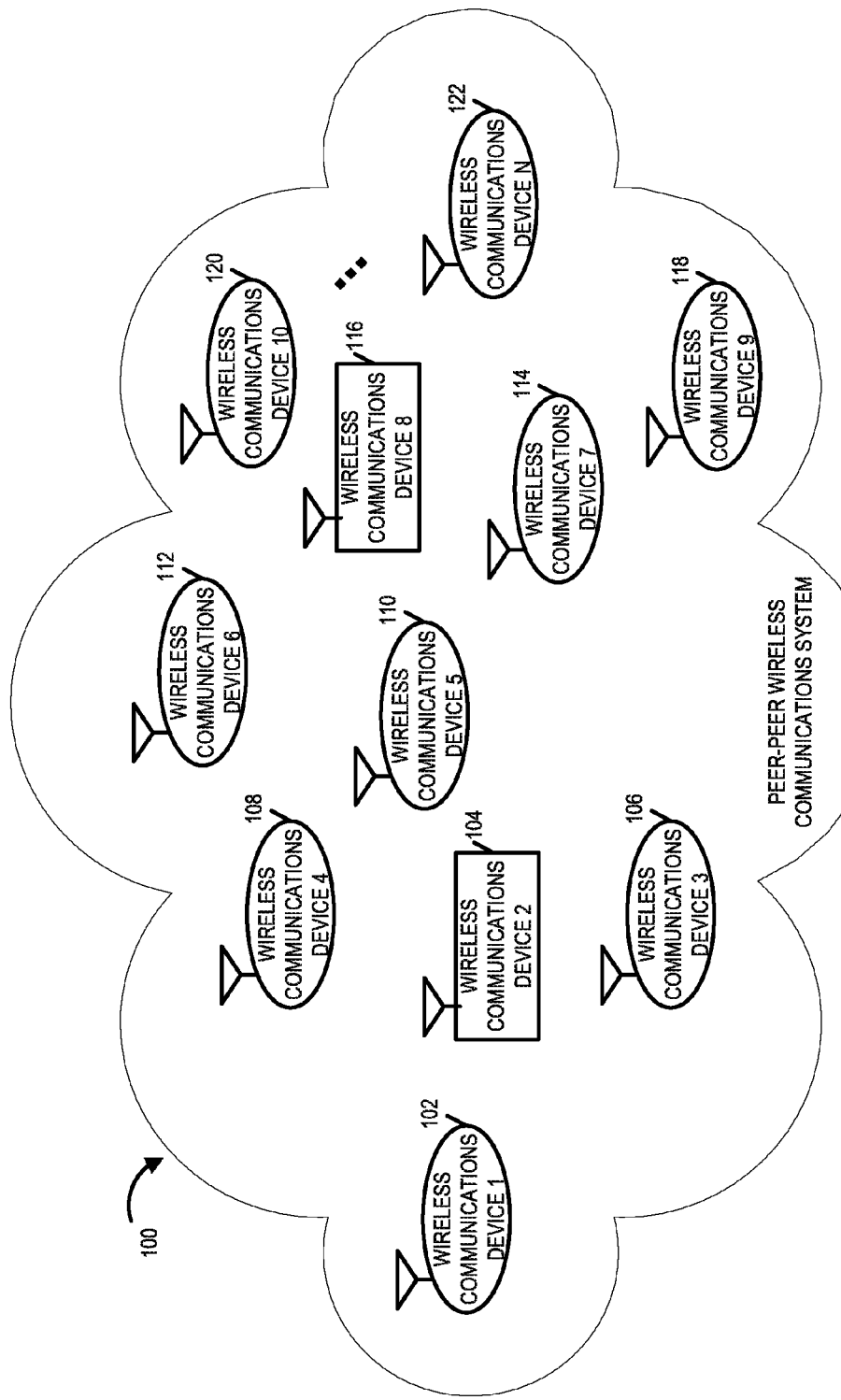
FIG. 1 is a drawing of an exemplary peer to peer wireless communications system in accordance with various exemplary embodiments.

FIG. 1 is a drawing of an exemplary peer to peer wireless communications system 100 in accordance with various exemplary embodiments. Exemplary peer to peer wireless communications system 100 includes a plurality of wireless communications devices (wireless communications device 1 102, wireless communications device 2 104, wireless communications device 3 106, wireless communications device 4 108, wireless communications device 5, 110, wireless communications device 6 112, wireless communications device 7 114, wireless communications device 8 116, wireless communications device 9 118, wireless communications device 10 120, . . . , wireless communications device N 122) which support a peer to peer signaling protocol. Exemplary wireless communications devices (102, 106, 108, 110, 112, 114, 118, 120, 122) are mobile devices while wireless communications devices (104, 116) are stationary devices.

In exemplary system 100 wireless communications devices independently determine what channels are to be used for peer discovery without a central controller indicating the channel or channels to be used. In some embodiments, assuming channels are of a suitable quality, the channels having the best quality need not be identified and selected. In various embodiments, a wireless communications device in system 100 selects a channel or channels to use for peer discovery in accordance with a predetermined channel ordering, e.g., alphabetically based on channel name or numerically based on predetermined channel numbers. In various embodiments, channels which are determined to have a channel quality below a predetermined threshold are excluded from being selected. Different wireless communications devices in system 100 use the same peer discovery channel selection method making it likely that the same channel or channels will tend to be picked. In some embodiments, the predetermined ordering used to select the channels is a time dependent ordering scheme, e.g., different ordering is used at different times. In some embodiments, all of the wireless communications devices in system 100 use the same ordering scheme. In some embodiments, different predetermined ordering of the channels is used by different set of devices in the wireless communications system 100, e.g., different predetermined ordering schemes, in some embodiments, are associated with different groups.

Figure 2:
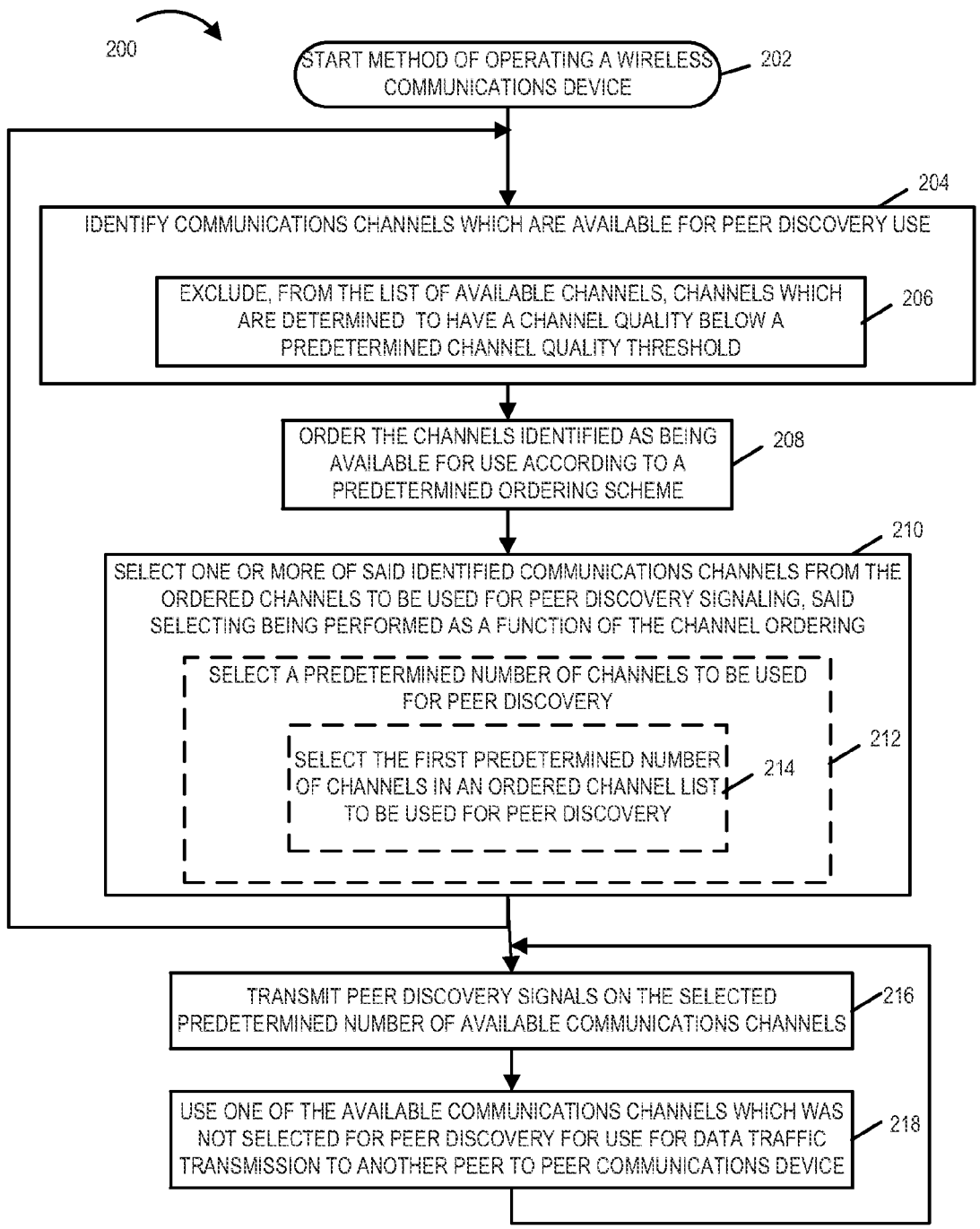
FIG. 2 is a flowchart of an exemplary method of operating a wireless communications device, e.g., a first peer to peer communications device, in accordance with various exemplary embodiments.

FIG. 2 is a flowchart 200 of an exemplary method of operating a wireless communications device, e.g., a first peer to peer communications device, in accordance with various exemplary embodiments. Operation of the exemplary method starts in step 202, where the wireless communications device is powered on and initialized and proceeds to step 204. In step 204 the wireless communications device identifies communications channels which are available for peer discovery use. Step 204 includes step 206, in which the wireless communications device excludes, from the list of available channels, channels which are determined to have a channel quality below a predetermined channel quality threshold. Operation proceeds from step 204 to step 208.

In step 208, the wireless communications device orders the channels identified as being available for use according to a predetermined ordering scheme. In some embodiments, the predetermined ordering scheme is a time dependent ordering scheme, e.g., different ordering is used at different predetermined times. Operation proceeds from step 208 to step 210. In step 210 the wireless communications device selects one or more of said identified communications channels from the ordered channels to be used for peer discovery signaling, said selecting being performed as a function of the channel ordering. In some embodiments, step 210 includes step 212, in which the wireless communications device selects a predetermined number of channels to be used for peer discovery. In some such embodiments, the predetermined number is one or two. Step 212, in some embodiments, includes step 214 in which the wireless communications device selects the first predetermined number of channels in an ordered channel list to be used for peer discovery. In some such embodiments, the channel ordering is independent of channel quality. In some such embodiments, the channel ordering is based alphabetically on predetermined channel names or numerically based on predetermined channel numbers.

Operation proceeds from step 210 to the input of step 204 and to step 216. In various embodiments step 214 of identifying communications channels and step 210 of selecting one or more channels are repeated on a periodic basis.

In step 216 the wireless communications device transmits peer discovery signals on the selected predetermined number of available communications channels. Operation proceeds from step 216 to step 218. In step 218 the wireless communications device uses one of the available communications channels which was not selected for peer discovery for use in data traffic transmission to another peer to peer communications device. Operation proceeds from step 218 to the input of step 216.

Figure 3:
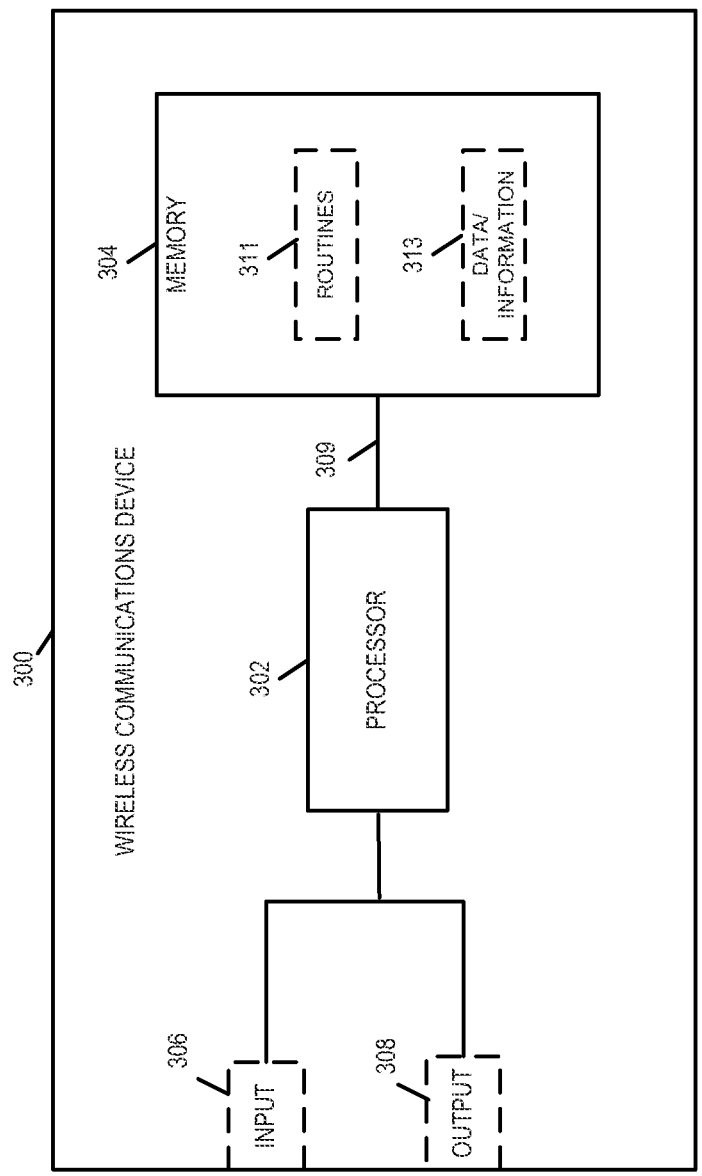
FIG. 3 is a drawing of an exemplary wireless communications device in accordance with an exemplary embodiment.

FIG. 3 is a drawing of an exemplary wireless communications device 300 in accordance with an exemplary embodiment. Exemplary wireless communications device 300 is, e.g., one of the wireless communications devices of system 100 of FIG. 1. Exemplary wireless communications device 300 may, and sometimes does, implement a method in accordance with flowchart 200 of FIG. 2.

Wireless communications device 300 includes a processor 302 and memory 304 coupled together via a bus 309 over which the various elements (302, 304) may interchange data and information. Wireless device 300 further includes an input module 306 and an output module 308 which may be coupled to processor 302 as shown. However, in some embodiments, the input module 306 and output module 308 are located internal to the processor 302. Input module 306 can receive input signals. Input module 306 can, and in some embodiments does, include a wireless receiver and/or a wired or optical input interface for receiving input. Output module 308 may include, and in some embodiments does include, a wireless transmitter and/or a wired or optical output interface for transmitting output. In some embodiments, memory 304 includes routines 311 and data/information 313.

In various embodiments, processor 302 is configured to: identify communications channels which are available for peer discovery use, order the channels identified as being available for use according to a predetermined ordering scheme, and select one or more of said identified communications channels from the ordered channels to be used for peer discovery signaling, said selecting being performed as a function of the channel ordering. In some embodiments, the predetermined ordering scheme is a time dependent ordering scheme, e.g., different ordering is used at different predetermined times.

In some embodiments, processor 302 is configured to select a predetermined number of channels to be used for peer discovery as part of being configured to select one or more of said plurality of communications channels to be used for peer discovery. In some such embodiments, said predetermined number is one or two.

In some embodiments, processor 302 is configured to select the first predetermined number of channels in said ordered channel list to be used for peer discovery as part of being configured to select one or more of said identified communications channels. In some such embodiments, said channel ordering is independent of channel quality. In some embodiments, said channel ordering is based alphabetically on predetermined channel names or numerically based on predetermined channel numbers.

In various embodiments, processor 302 is configured to exclude, from the list of available channels, channels which are determined to have a channel quality below a predetermined channel quality threshold identifying communications channels which are available for peer discovery, as part of being configured to identify communications channels which are available for peer discovery.

In some embodiments, processor 302 is further configured to transmit peer discovery signals on the selected predetermined number of available communications channels. In some such embodiments, said wireless communications device including processor 302 is a first peer to peer communications device, and processor 302 is further configured to use one of the available communications channels which was not selected for peer discovery use for data traffic transmissions to another peer to peer communications device.

In various embodiments, processor 302 is further configured to repeat said identifying and selecting steps on a periodic basis.

Figure 4:
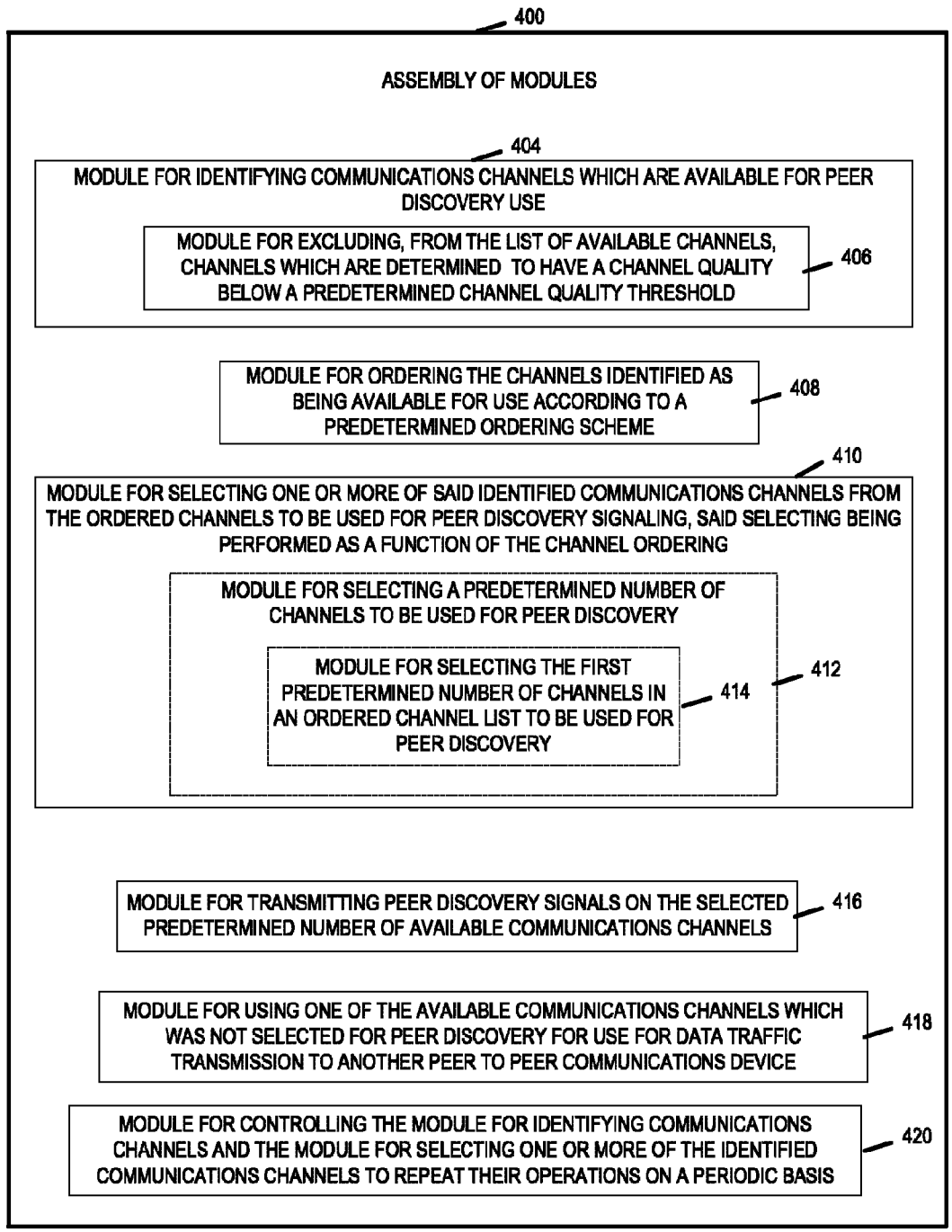
FIG. 4 is an assembly of modules which can, and in some embodiments is, used in the exemplary wireless communications device illustrated in FIG. 3.

FIG. 4 is an assembly of modules 400 which can, and in some embodiments is, used in the exemplary wireless communications device 300 illustrated in FIG. 3. The modules in the assembly 400 can be implemented in hardware within the processor 302 of FIG. 3, e.g., as individual circuits. Alternatively, the modules may be implemented in software and stored in the memory 304 of wireless communications device 300 shown in FIG. 3. In some such embodiments, the assembly of modules 400 is included in routines 311 of memory 304 of device 300 of FIG. 3. While shown in the FIG. 3 embodiment as a single processor, e.g., computer, it should be appreciated that the processor 302 may be implemented as one or more processors, e.g., computers. When implemented in software the modules include code, which when executed by the processor, configure the processor, e.g., computer, 302 to implement the function corresponding to the module. In some embodiments, processor 302 is configured to implement each of the modules of the assembly of modules 400. In embodiments where the assembly of modules 400 is stored in the memory 304, the memory 304 is a computer program product comprising a computer readable medium, e.g., a non-transitory computer readable medium, comprising code, e.g., individual code for each module, for causing at least one computer, e.g., processor 302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 4 control and/or configure the wireless communications device 300 or elements therein such as the processor 302, to perform the functions of the corresponding steps illustrated and/or described in the method of flowchart 200 of FIG. 2.

Assembly of modules 400 includes a module 404 for identifying channels which are available for peer discovery use, a module 408 for ordering the channels identified as being available for use according to a predetermined ordering scheme, a module 410 for selecting one or more of said identified communications channels from the ordered channels to be used for peer discovery signaling, said selecting being performed as a function of the channel ordering. In some embodiments, the predetermined ordering scheme is a time dependent ordering scheme, e.g., different ordering is used at different predetermined times.

Assembly of modules 400 further includes a module 416 for transmitting peer discovery signals on the selected predetermined number of available communications channels and a module 418 for using one of the available communications channels which was not selected for peer discovery for use for data traffic transmission to another peer to peer communications device. Assembly of modules 400 further includes a module 420 for controlling the module 404 for identifying the communications channels which are available and module 410 for selecting one or more of the identified channels to repeat their operations on a periodic basis.

Module 404 includes a module 406 for excluding, from the list of available channels, channels which are determined to have a channel quality below a predetermined channel quality threshold. Module 410 includes a module 412 for selecting a predetermined number of channels to be used for peer discovery. In various embodiments, the predetermined number is one or two. Module 412 includes a module 414 for selecting the first predetermined number of channels in the ordered list to be used for peer discovery. In various embodiments, the channel ordering is independent of channel quality. In some embodiments, the channel ordering is based alphabetically on predetermined channel names or numerically based on predetermined channel number.

Figure 5:
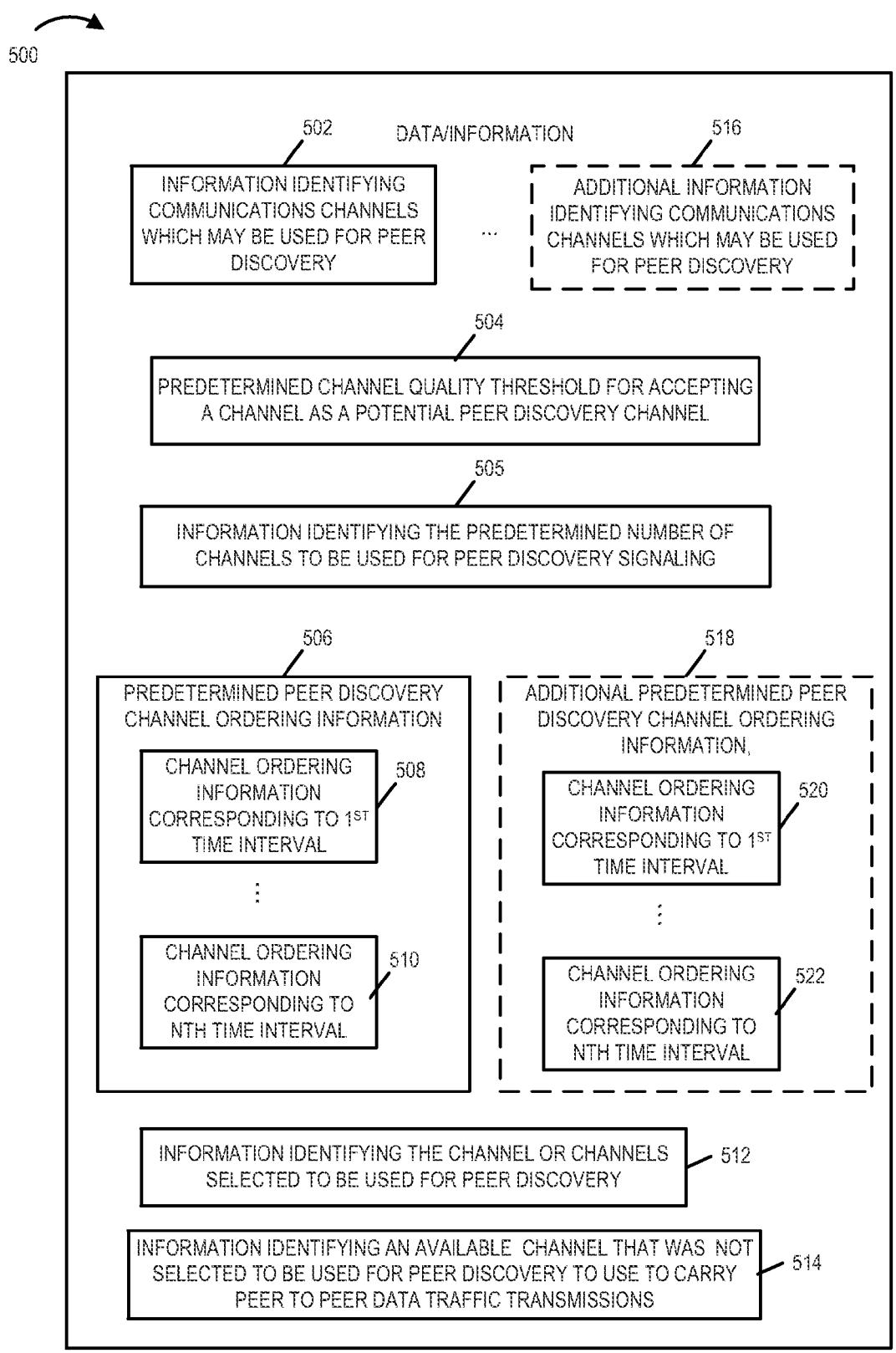
FIG. 5 is a drawing of exemplary data/information in accordance with various embodiments.

FIG. 5 is a drawing of exemplary data/information 500 in accordance with various embodiments. Data/information 500 is, e.g., included in data/information 313 of memory 304 of wireless communications device 300 of FIG. 3. Data/information 500 include information identifying communications channels which may be used for peer discovery 502, a stored predetermined channel quality threshold for accepting a channel as a potential peer discovery channel 504, information identifying the predetermined number of channels to be used for peer discovery signaling 505, predetermined peer discovery channel ordering information 506, information identifying the channel or channels selected to be used for peer discovery 512, and information identifying an available channel that was not selected to be used for peer discovery to use to carry peer to peer data traffic transmissions 514. Predetermined peer discovery channel ordering information 506 includes channel ordering information corresponding to a plurality of time intervals in a recurring peer to peer timing structure (channel ordering information corresponding to a first time interval 508, . . . , channel ordering information corresponding to an Nth time interval 510).

In some embodiments, different channels are selected for peer discovery as a function of user identification information, device identification information, or group identification information. In some embodiments, data/information includes an additional information identifying communications channels which may be used for peer discovery 516, and additional predetermined peer to peer discovery channel ordering information 518. Additional predetermined peer discovery channel ordering information 518 includes channel ordering information corresponding to a plurality of time intervals in a recurring peer to peer timing structure (channel ordering information corresponding to a first time interval 520, . . . , channel ordering information corresponding to an Nth time interval 522).

FIGS. 6-10 illustrate an example of operating wireless communications devices in accordance with an exemplary embodiment. Drawing 600 of FIG. 6 includes drawing 602 illustrating information identifying potential channels which may be used for peer discovery and drawing 604 illustrating exemplary predetermined channel ordering information. In this example, the channel with channel order #1 has the highest channel order and the channel with channel order #6 has the lowest channel order with regard to channel selection for use as a peer discovery channel.

Drawing 602 includes a vertical axis 603 representing frequency.

In this example there are 18 different frequency bands (f1, f2, f3, f4, f5, f6, f7, f8, f9, f10, f11, f12, f13, f14, f15, f16, f17, f18). Each frequency band corresponds to a set of one or more tones. Column 611 illustrates that frequency bands f2, f3, f9, f14, f17, and f18 correspond to potential channels which may be used for peer discovery; and that frequency bands f1, f4, f5, f6, f7, f8, f10, f11, f12, f13, f15, and f16 may not be used for peer discovery.

Drawing 604 includes a vertical axis 603 representing frequency and a horizontal axis 605 representing time. First time interval T1 607 and second time interval T2 609 occur along time axis 605 as part of a recurring peer to peer timing structure. Column 613 indicates that during time interval T1: channel A which has channel order #1 corresponds to frequency band f17; channel B which has channel order #2 corresponds to frequency band f14; channel C which has channel order #3 corresponds to frequency band f9; channel D which has channel order #4 corresponds to frequency band f3; channel E which has channel order #5 corresponds to frequency band f18; and channel F which has channel order #6 corresponds to frequency band f2. Column 615 indicates that during time interval T2: channel A which has channel order #1 corresponds to frequency band f2; channel B which has channel order #2 corresponds to frequency band f18; channel C which has channel order #3 corresponds to frequency band f3; channel D which has channel order #4 corresponds to frequency band f14; channel E which has channel order #5 corresponds to frequency band f9; and channel F which has channel order #6 corresponds to frequency band f17.

Figure 6:
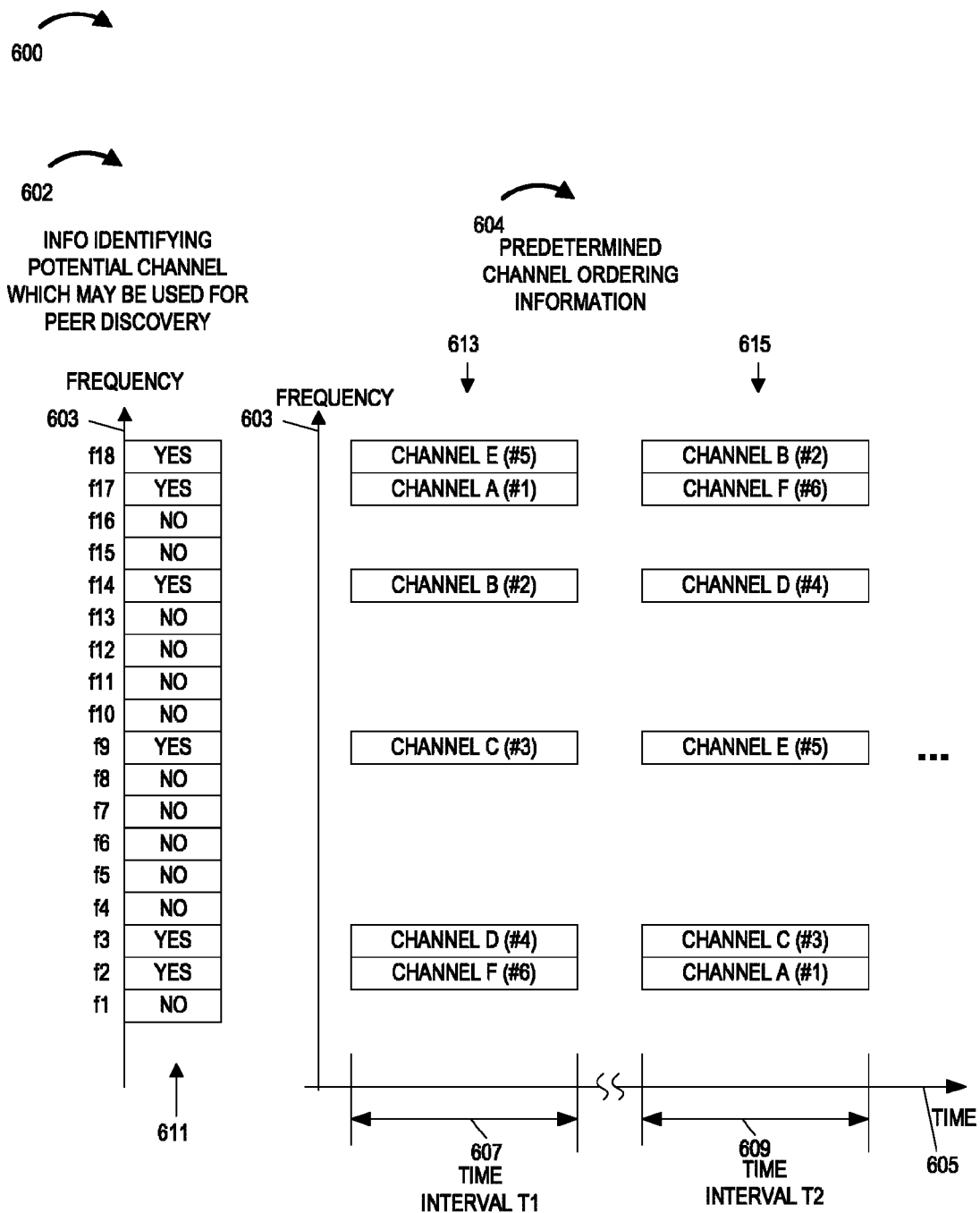
FIG. 6 illustrates exemplary information identifying potential channels which may be used for peer discovery and exemplary predetermined channel ordering information.
Figure 7:
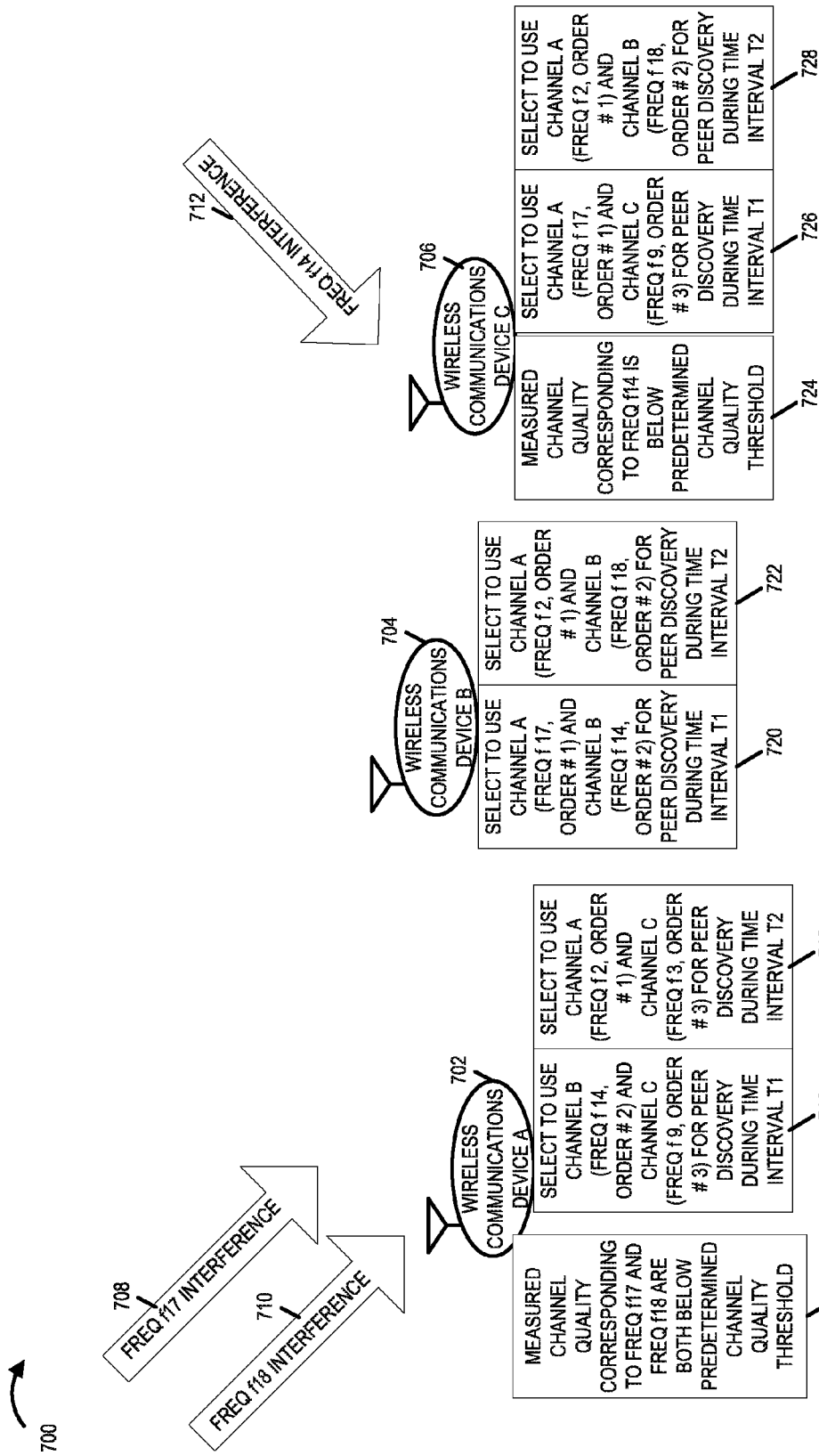
FIG. 7 illustrates three exemplary wireless communications devices, which independently select which channels use for peer discovery in an exemplary peer to peer wireless communications system in accordance with an exemplary embodiment.

FIG. 7 includes drawing 700 which illustrates three exemplary wireless communications devices (wireless communications device A 702, wireless communications device B 704, wireless communications device C 706) in an exemplary peer to peer wireless communications system. The exemplary wireless communications devices (702, 704, 706) are, e.g., any of the exemplary wireless communications devices of system 100 of FIG. 1 and/or implement a method in accordance with flowchart 200 of FIG. 2 and/or are implemented in accordance with wireless communications device 300 of FIG. 3. Consider that the wireless communications devices (702, 704, 706) include information 602 identifying potential channels which may be used for peer discovery and predetermined channel ordering information 604 of FIG. 6.

Further consider that in the vicinity of wireless communications device A 702 there is strong interference on frequency band f17 as indicated by arrow 708 and strong interference on frequency band f18 as indicated by arrow 710. Also, in the vicinity of wireless communications device C 706 there is strong interference on frequency band f14 as indicated by arrow 712.

Wireless communications device A 702 measures the channel quality corresponding to each of the potential channels which may be used for peer discovery and determines that the measured channel quality corresponding to frequency band f17 and frequency band f18 are both below a predetermined channel quality threshold; therefore wireless communications device A 702 excludes the channels corresponding to f17 and f18, from the list of potential channels which may be used for peer discovery.

Wireless communications device A 702 identifies that during time interval T1 the following communications channels are available for peer discovery: channel B corresponding to frequency band f14, channel C corresponding to frequency band f9, channel D corresponding to frequency band f3 and channel F corresponding to frequency band f2. Note that channel E corresponding to frequency band f18 and channel A corresponding to frequency band f17 have been excluded.

Wireless communications device A 702 orders the channels identified as being available for peer discovery in accordance with the predetermined ordering information 613 of FIG. 6, e.g., obtaining an order list: channel B (#2), channel C (#3), channel D (#4) and channel F (#6). In this example, wireless communications device A selects a predetermined number of channels to be used for peer discovery where the predetermined number is 2; and the selection is of the first 2 channel in the ordered list to be used for peer discovery. Therefore wireless communications device A 702 selects to use channel B corresponding to frequency f14 with order #2 and channel C corresponding to frequency f9 with order #3 for peer discovery during time interval T1 as indicated by box 716.

Wireless communications device A 702 identifies that during time interval T2 the following communications channels are available for peer discovery: channel D corresponding to frequency band f14, channel E corresponding to frequency band f9, channel C corresponding to frequency band f3 and channel A corresponding to frequency band f2. Note that channel B corresponding to frequency band f18 and channel F corresponding to frequency band f17 have been excluded.

Wireless communications device A 702 orders the channels identified as being available for peer discovery in accordance with the predetermined ordering information 615 of FIG. 6, e.g., obtaining an order list: channel A (#1), channel C (#3), channel D (#4) and channel E (#5). In this example, wireless communications device A 702 selects a predetermined number of channels to be used for peer discovery where the predetermined number is 2; and the selection is of the first 2 channel in the ordered list to be used for peer discovery. Therefore wireless communications device A 702 selects to use channel A corresponding to frequency f2 with order #1 and channel C corresponding to frequency f3 with order #3 for peer discovery during time interval T2 as indicated by box 718.

Wireless communications device B 704 measures the channel quality corresponding to each of the potential channels which may be used for peer discovery and determines that the measured channel quality corresponding to each of the potential channels of information 602 meets or exceeds the predetermined channel quality threshold the channels. Wireless communications device A 702 identifies that during time interval T1 the following communications channels are available for peer discovery: channel E corresponding to frequency band f18, channel A corresponding to frequency band f17, channel B corresponding to frequency band f14, channel C corresponding to frequency band f9, channel D corresponding to frequency band f3 and channel F corresponding to frequency band f2.

Wireless communications device B 704 orders the channels identified as being available for peer discovery in accordance with the predetermined ordering information 613 of FIG. 6, e.g., obtaining an order list: channel A (#1), channel B (#2), channel C (#3), channel D (#4), channel E (#5) and channel F (#6). In this example, wireless communications device B 704 selects a predetermined number of channels to be used for peer discovery where the predetermined number is 2; and the selection is of the first 2 channels in the ordered list to be used for peer discovery. Therefore wireless communications device B 704 selects to use channel A corresponding to frequency f17 with order #1 and channel B corresponding to frequency f14 with order #2 for peer discovery during time interval T1 as indicated by box 720.

Wireless communications device B 704 identifies that during time interval T2 the following communications channels are available for peer discovery: channel B corresponding to frequency band f18, channel f corresponding to frequency band f17, channel D corresponding to frequency band f14, channel E corresponding to frequency band f9, channel C corresponding to frequency band f3 and channel A corresponding to frequency band f2.

Wireless communications device B 704 orders the channels identified as being available for peer discovery in accordance with the predetermined ordering information 615 of FIG. 6, e.g., obtaining an order list: channel A (#1), channel B (#2), channel C (#3), channel D (#4), channel E (#5) and channel F (#6). In this example, wireless communications device B 704 selects a predetermined number of channels to be used for peer discovery where the predetermined number is 2; and the selection is of the first 2 channels in the ordered list to be used for peer discovery. Therefore wireless communications device B 704 selects to use channel A corresponding to frequency f2 with order #1 and channel B corresponding to frequency f18 with order #2 for peer discovery during time interval T2 as indicated by box 722.

Wireless communications device C 706 measures the channel quality corresponding to each of the potential channels which may be used for peer discovery and determines that the measured channel quality corresponding to frequency band f14 is below a predetermined channel quality threshold; therefore wireless communications device C 706 excludes the channel corresponding to f14 from the list of potential channels which may be used for peer discovery.

Wireless communications device C 706 identifies that during time interval T1 the following communications channels are available for peer discovery: channel E corresponding to frequency band f18, channel A corresponding to frequency band f17, channel C corresponding to frequency band f9, channel D corresponding to frequency band f3 and channel F corresponding to frequency band f2. Note that channel B corresponding to frequency band f14 has been excluded.

Wireless communications device C 706 orders the channels identified as being available for peer discovery in accordance with the predetermined ordering information 613 of FIG. 6, e.g., obtaining an order list: channel A (#1), channel C (#3), channel D (#4), channel E (#5) and channel F (#6). In this example, wireless communications device C 706 selects a predetermined number of channels to be used for peer discovery where the predetermined number is 2; and the selection is of the first 2 channel in the ordered list to be used for peer discovery. Therefore wireless communications device C 706 selects to use channel A corresponding to frequency f17 with order #1 and channel C corresponding to frequency f9 with order #3 for peer discovery during time interval T1 as indicated by box 726.

Wireless communications device C 706 identifies that during time interval T2 the following communications channels are available for peer discovery: channel B corresponding to frequency band f18, channel F corresponding to frequency band f17, channel E corresponding to frequency band f9, channel C corresponding to frequency band f3 and channel A corresponding to frequency band f2. Note that channel D corresponding to frequency band f14 has been excluded.

Wireless communications device C 706 orders the channels identified as being available for peer discovery in accordance with the predetermined ordering information 615 of FIG. 6, e.g., obtaining an order list: channel A (#1), channel B (#2), channel C (#3), channel E (#5) and channel F (#6). In this example, wireless communications device C 706 selects a predetermined number of channels to be used for peer discovery where the predetermined number is 2; and the selection is of the first 2 channels in the ordered list to be used for peer discovery. Therefore wireless communications device C 706 selects to use channel A corresponding to frequency f2 with order #1 and channel B corresponding to frequency f18 with order #2 for peer discovery during time interval T2 as indicated by box 728.

Figure 8:
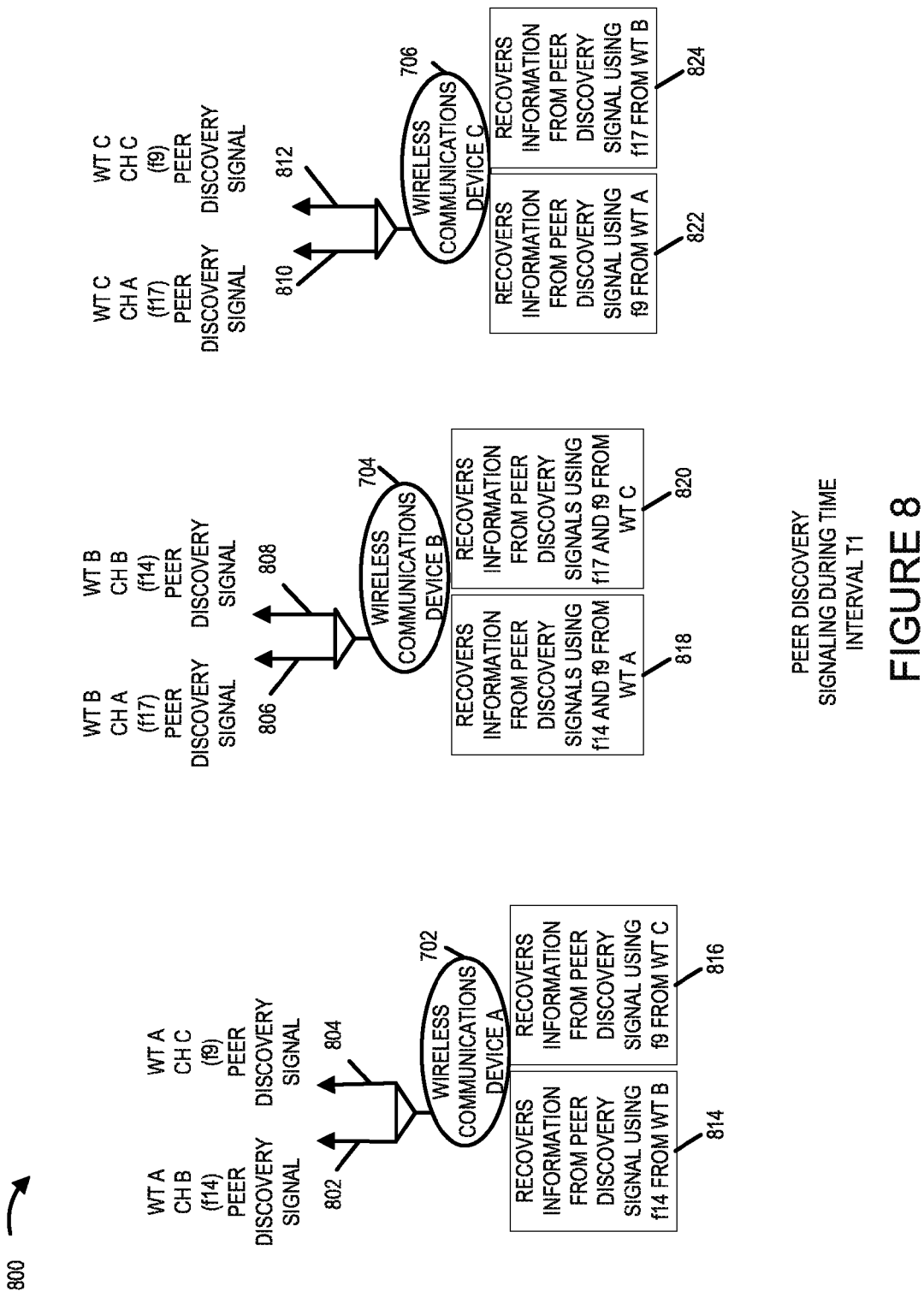
FIG. 8 illustrates exemplary peer discovery signaling on selected channels and exemplary peer discovery signaling recovery during a first time interval corresponding to the channel selections and interference situation of FIG. 7.

FIG. 8 includes drawing 800 illustrating exemplary peer discovery signaling on the selected channels and exemplary peer discovery signaling recovery during time interval T1 corresponding to the channel selections and interference situation of FIG. 7. Wireless communications device A 702 transmits peer discovery signal 802 using selected communications channel B which corresponds to frequency band f14 and peer discovery signal 804 using selected communications channel C which corresponds to frequency band f9. Wireless communications device B 704 transmits peer discovery signal 806 using selected communications channel A which corresponds to frequency band f17 and peer discovery signal 808 using selected communications channel B which corresponds to frequency band f14. Wireless communications device C 706 transmits peer discovery signal 810 using selected communications channel A which corresponds to frequency band f17 and peer discovery signal 812 using selected communications channel C which corresponds to frequency band f9.

Wireless communications A 702 recovers information from the peer discovery signal 808 communicated using frequency band f14 from wireless communications device B as indicated by block 814. Wireless communications A 702 also recovers information from the peer discovery signal 812 communicated using frequency band f9 from wireless communications device C as indicated by block 816.

Wireless communications B 704 recovers information from the peer discovery signal 802 communicated using frequency band f14 and the peer discovery signal 804 communicated using frequency band f9 from wireless communications device A as indicated by block 818. Wireless communications B 704 recovers information from the peer discovery signal 810 communicated using frequency band f17 and the peer discovery signal 812 communicated using frequency band f9 from wireless communications device C as indicated by block 820.

Wireless communications C 706 recovers information from the peer discovery signal 804 communicated using frequency band f9 from wireless communications device A as indicated by block 822. Wireless communications C 706 also recovers information from the peer discovery signal 806 communicated using frequency band f17 from wireless communications device B as indicated by block 824.

Figure 9:
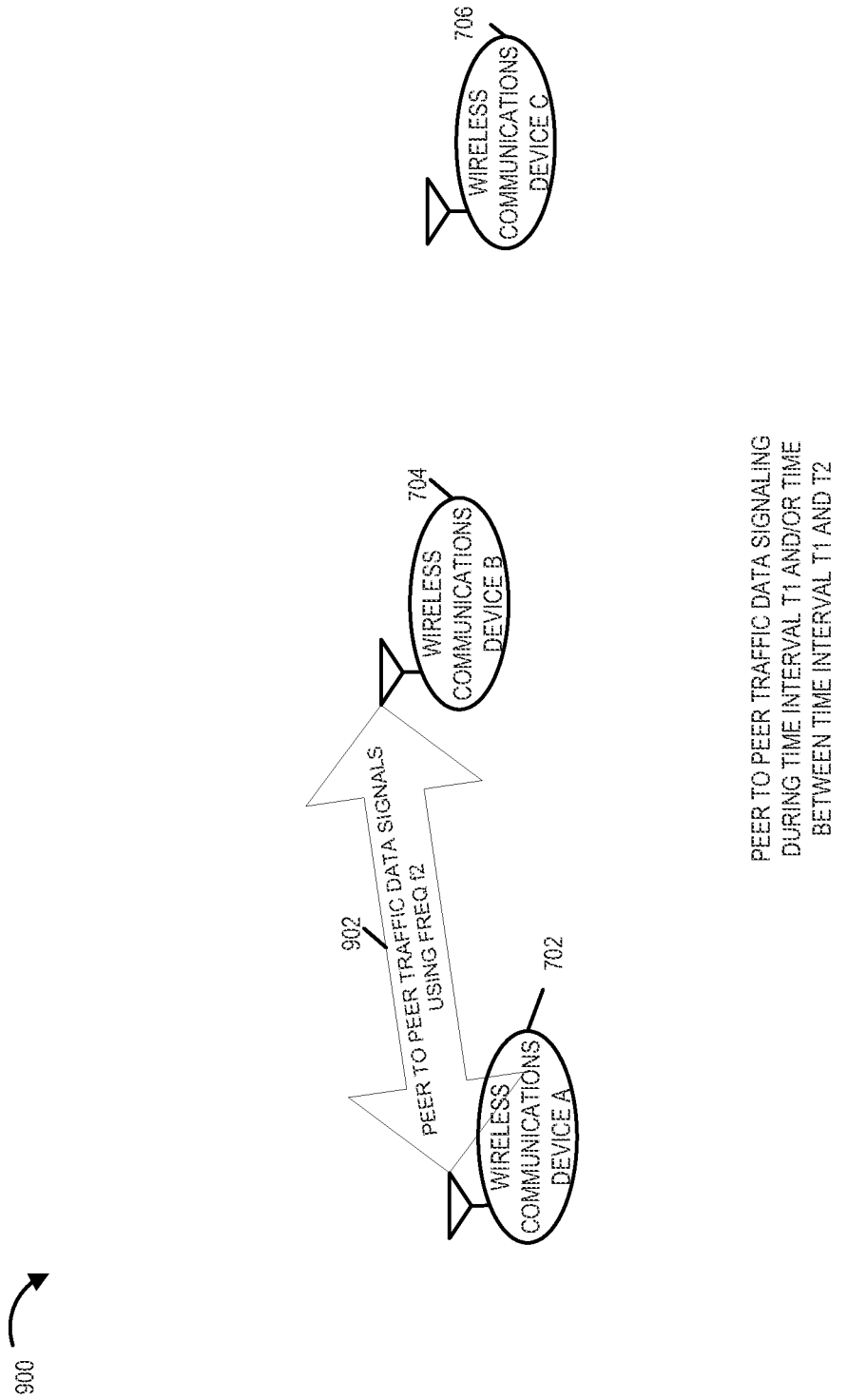
FIG. 9 includes illustrating exemplary peer to peer traffic data signaling.

FIG. 9 includes drawing 900 illustrating exemplary peer to peer traffic data signaling during time interval T1 and/or during the time interval between time interval T1 and time interval T2. Bidirectional arrow 902 indicates that there are peer to peer traffic data signals being communicated between wireless communications device A 702 and wireless communications device B 704 using frequency band f2. For example, wireless communications device A 702 may be transmitting peer to peer traffic data signals to wireless communications device B 704 using frequency band f2. Alternatively, wireless communications device B 704 may be transmitting peer to peer traffic data signals to wireless communications device A 702 using frequency band f2. In various embodiments, the frequency band used for peer to peer traffic signals is agreed upon my mutual agreement between wireless communications device A 702 and wireless communications device B 704. Note that during time interval T1 the channel corresponding to frequency band f2, channel F, is one of the available channels, which was available to both wireless communications device A and wireless communications device B, which was not selected for peer discovery use. In some embodiments, the wireless communications devices select to use the channel, which is available to both devices and which has the lowest order in the peer discovery ordering list, for peer to peer traffic signaling. In some embodiments, the wireless communications devices select to use a channel, which is available to both devices and which is among a predetermined number, e.g., two or three, of the lowest order channels in the peer discovery ordering list, for peer to peer traffic signaling.

Figure 10:
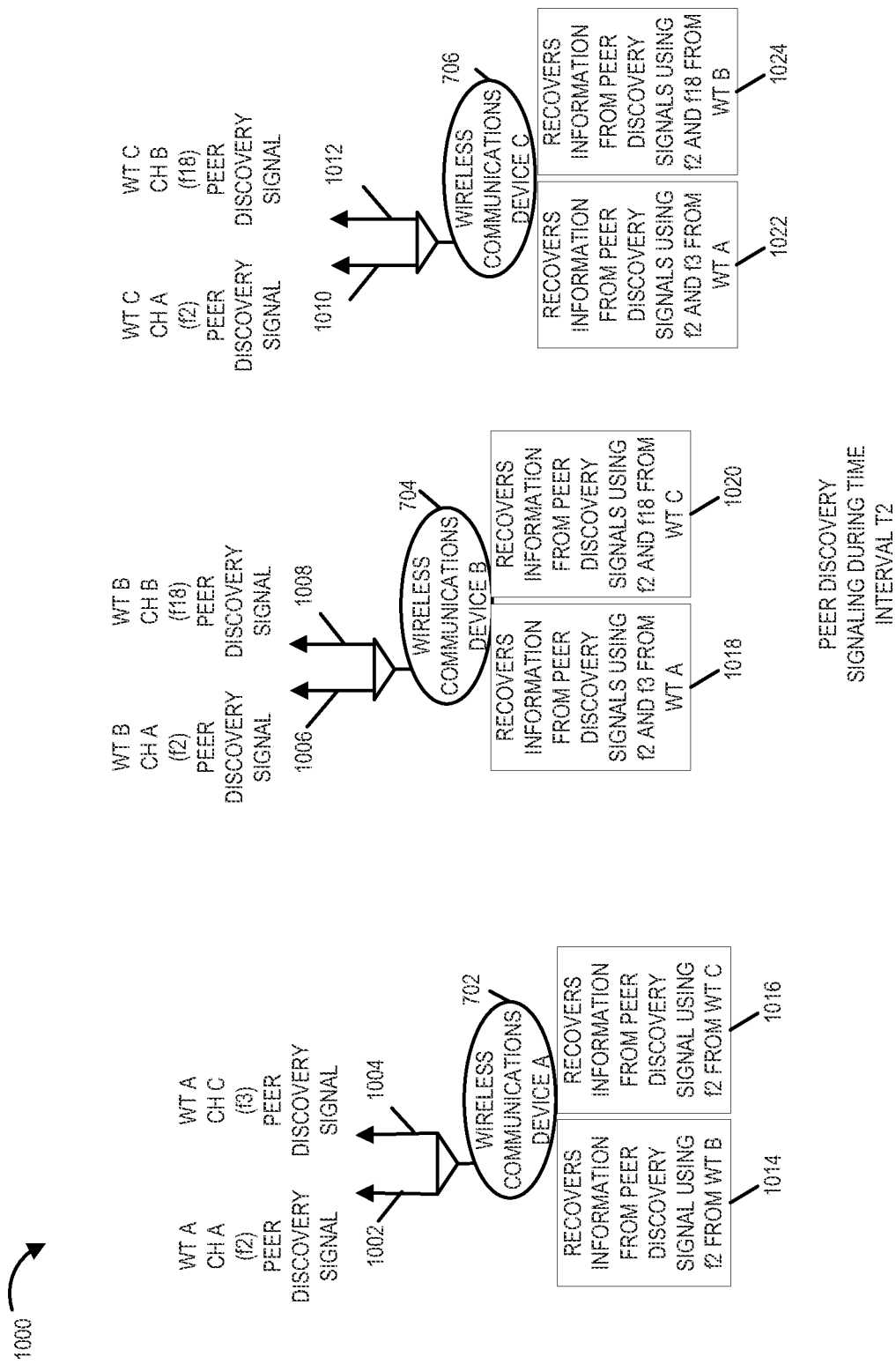
FIG. 10 illustrates exemplary peer discovery signaling on selected channels and exemplary peer discovery signaling recovery during a second time interval corresponding to the channel selections and interference situation of FIG. 7.

FIG. 10 includes drawing 1000 illustrating exemplary peer discovery signaling on the selected channels and exemplary peer discovery signaling recovery during time interval T2 corresponding to the channel selections and interference situation of FIG. 7. Wireless communications device A 702 transmits peer discovery signal 1002 using selected communications channel A which corresponds to frequency band f2 and peer discovery signal 1004 using selected communications channel C which corresponds to frequency band f3. Wireless communications device B 704 transmits peer discovery signal 1006 using selected communications channel A which corresponds to frequency band f2 and peer discovery signal 1008 using selected communications channel B which corresponds to frequency band f18. Wireless communications device C 706 transmits peer discovery signal 1010 using selected communications channel A which corresponds to frequency band f2 and peer discovery signal 1012 using selected communications channel B which corresponds to frequency band f18.

Wireless communications A 702 recovers information from the peer discovery signal 1006 communicated using frequency band f2 from wireless communications device B as indicated by block 1014. Wireless communications A 702 also recovers information from the peer discovery signal 1010 communicated using frequency band f2 from wireless communications device C as indicated by block 1016.

Wireless communications B 704 recovers information from the peer discovery signal 1002 communicated using frequency band f2 and the peer discovery signal 1004 communicated using frequency band f3 from wireless communications device A as indicated by block 1018. Wireless communications B 704 recovers information from the peer discovery signal 1010 communicated using frequency band f2 and the peer discovery signal 1012 communicated using frequency band f18 from wireless communications device C as indicated by block 1020.

Wireless communications C 706 recovers information from the peer discovery signal 1002 communicated using frequency band f2 and from peer discovery signal 1004 communicated using frequency band f3 from wireless communications device A as indicated by block 1022. Wireless communications C 706 also recovers information from the peer discovery signal 1006 communicated using frequency band f2 and from peer discovery signal 1008 communicated using frequency band f18 from wireless communications device B as indicated by block 1024.

Figure 11:
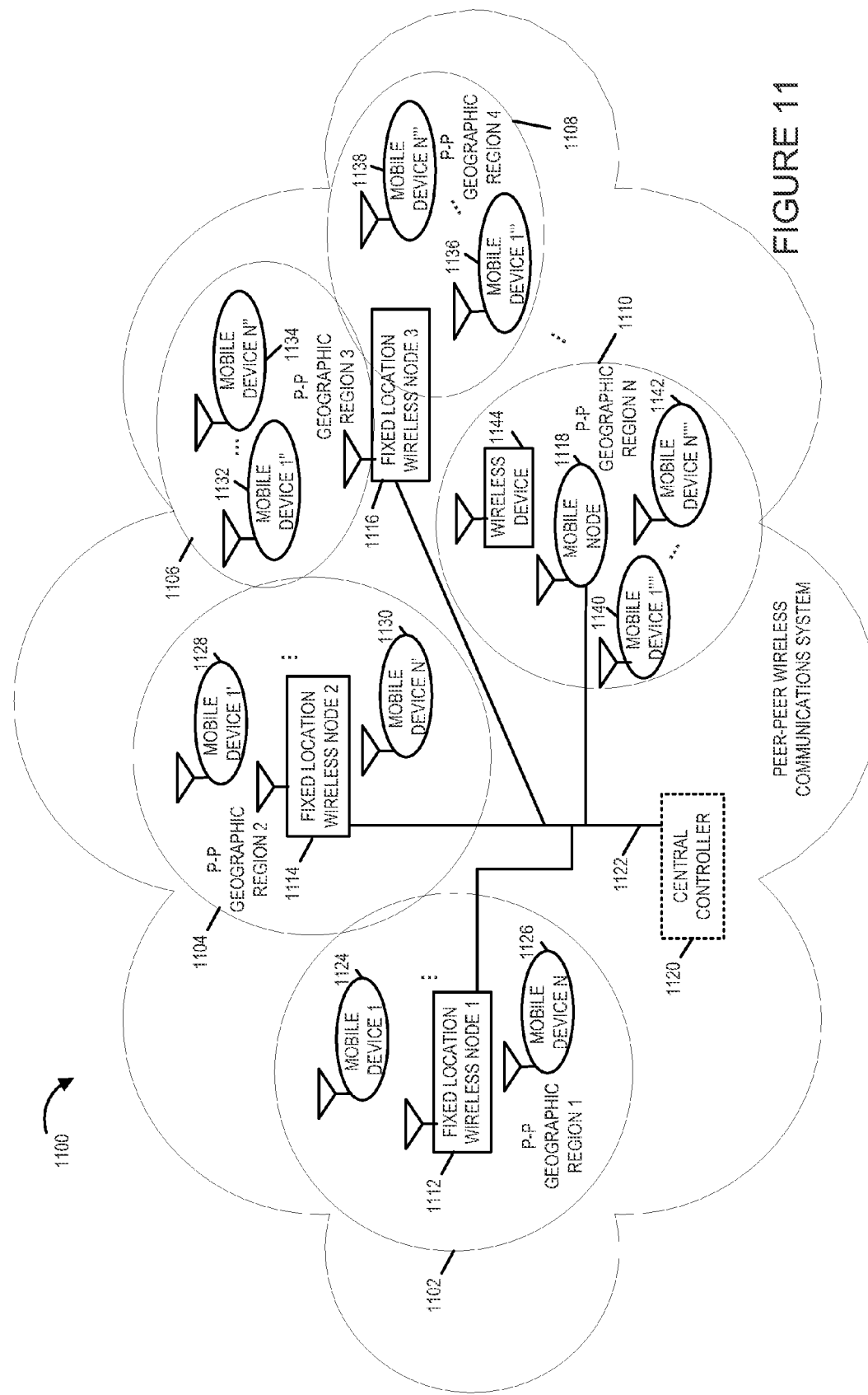
FIG. 11 is a drawing of an exemplary peer to peer wireless communications system in which peer to peer discovery channel selection is performed using a centralized approach in accordance with various embodiments.

FIG. 11 is a drawing of an exemplary peer to peer wireless communications system 1100 in accordance with various embodiments. Exemplary system 100 includes a plurality of peer to peer geographic regions (peer to peer geographic region 1 1102, peer to peer geographic region 3 1106, peer to peer geographic region 4 1108, . . . , peer to peer geographic region N 1110).

Peer to peer geographic region 1 1102 includes fixed location wireless node 1 1112 and a plurality of mobile wireless communications devices which support peer to peer communications (mobile device 1 1124, . . . , mobile device N 1126). Fixed location wireless node 1 1112 communicates to peer to peer devices (mobile device 1 1124, . . . , mobile device N 1126) in peer to peer geographic region 1 1102 information indicating which channels are to be used for peer discovery signaling in peer to peer geographic region 1 1102.

Peer to peer geographic region 2 1104 includes fixed location wireless node 2 1114 and a plurality of mobile wireless communications devices which support peer to peer communications (mobile device 1' 1128, . . . , mobile device N' 1130). Fixed location wireless node 2 1114 communicates to peer to peer devices (mobile device 1' 1128, . . . , mobile device N' 1130) in peer to peer geographic region 2 1104 information indicating which channels are to be used for peer discovery signaling in peer to peer geographic region 2 1104.

Peer to peer geographic region 3 1106 includes fixed location wireless node 3 1116 and a plurality of mobile wireless communications devices which support peer to peer communications (mobile device 1" 1132, . . . , mobile device N" 1134). Fixed location wireless node 3 1116 communicates to peer to peer devices (mobile device 1" 1132, . . . , mobile device N" 1134) in peer to peer geographic region 3 1106 information indicating which channels are to be used for peer discovery signaling in peer to peer geographic region 3 1106.

Peer to peer geographic region 4 1108 includes fixed location wireless node 3 1116 and a plurality of mobile wireless communications devices which support peer to peer communications (mobile device 1' 1136, . . . , mobile device N''' 1138). Fixed location wireless node 3 1116 communicates to peer to peer devices (mobile device 1' 1136, . . . , mobile device N''' 1138) in peer to peer geographic region 4 1108 information indicating which channels are to be used for peer discovery signaling in peer to peer geographic region 4 1108.

Peer to peer geographic region N 1110 includes mobile node 1118 and a plurality of mobile wireless communications devices which support peer to peer communications (mobile device 1'''' 1140, . . . , mobile device N'''' 1142) and fixed location wireless device 1144 supporting peer to peer communications. Mobile node 1118 communicates to peer to peer devices (mobile device 1' 1136, . . . , mobile device N''' 1138, wireless device 1144) in peer to peer geographic region N 1110 information indicating which channels are to be used for peer discovery signaling in peer to peer geographic region N 1110.

In some embodiments, the information indicating which channel or channels are to be used for peer discovery signaling in a region is communicated via broadcast signaling. In some embodiments, the information indicating which channel or channels are to be used for peer discovery signaling in a region is communicated using a cellular based signaling protocol. In some embodiments, the information indicating which channel or channels are to be used for peer discovery signaling in a region is communicated using a peer to peer signaling protocol.

In some embodiments, peer to peer wireless communications system 1100 also includes a central controller 1120, e.g., a central controller node, which is coupled to fixed location node 1 1112, fixed location wireless node 2 1114, fixed location wireless node 3 1116, and mobile node 1118 via a backhaul network 1122. In some embodiments, including central controller 1120, the central control selects the channels to use for peer discovery signals in the different peer to peer geographic regions of the peer to peer communications system 1100.

In some other embodiments, an individual wireless device determines the channel or channels to use for peer discovery signaling within its peer to peer geographic region. For example, fixed location wireless node 1 1112 determines the channel or channels to use for peer discovery signaling within peer to peer geographic region 1 1102; fixed location wireless node 2 1114 determines the channel or channels to use for peer discovery signaling within peer to peer geographic region 2 1104; fixed location wireless node 3 1116 determines the channel or channels to use for peer discovery signaling within peer to peer geographic region 3 1106; fixed location wireless node 3 1116 determines the channel or channels to use for peer discovery signaling within peer to peer geographic region 4 1108; and mobile node 1118 determines the channel or channels to use for peer discovery signaling within peer to peer geographic region N 1110.

In various embodiments, the selection of channel or channels to use for peer discovery in a region is performed as a function of the number of peer to peer devices already using individual channels for peer discovery in the region. Other factors used to influence the selection include: interference, the number of devices using a particular channel, device location information, and device communications range information. In some embodiments, the selection is biased to favor the channels already in use for peer discovery by a large number of devices.

The fixed location wireless nodes (1112, 1114, 1116) are, e.g., location anchor points, access points or base stations. Mobile node 1118 is, e.g., a mobile wireless communications device supporting both cellular communications and peer to peer communications which is serving as a temporary location anchor point.

The mobile wireless devices in system 100 may move throughout system 100 and be located in different peer to peer geographic regions at different times. A mobile wireless device supporting peer to peer communications (1124, 1126, 1128, 1130, 1132, 1134, 1136, 1138, 1140, 1142) may receive information from a different node indicating what channel or channels to use for peer discovery signaling when it is located in a different region.

Figure 12:
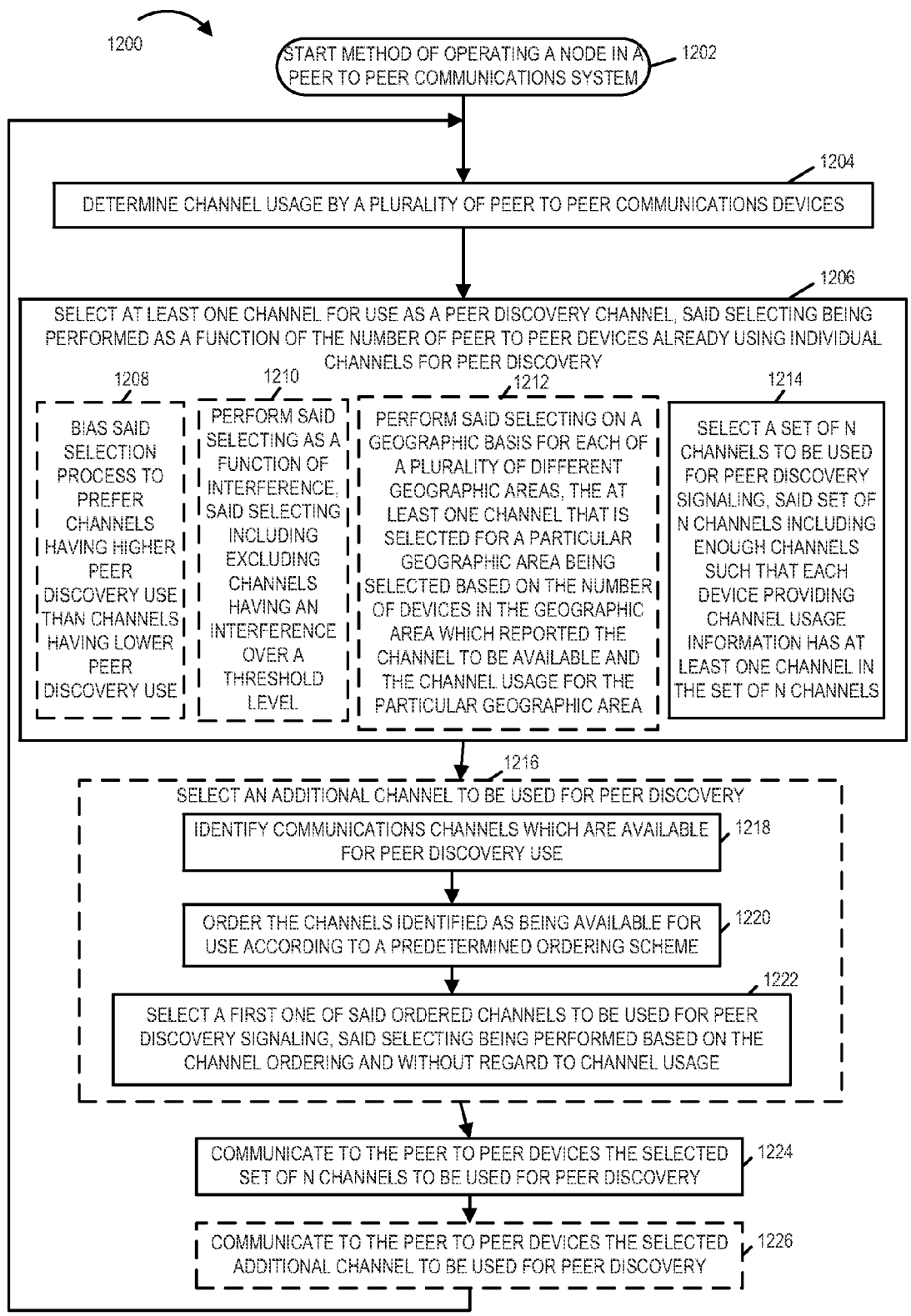
FIG. 12 is a flowchart of an exemplary method of operating a node, e.g., a central controller or individual wireless communications device, in a peer to peer communications system in accordance with various embodiments.

FIG. 12 is a flowchart 1200 of an exemplary method of operating a node, e.g., a central controller or individual wireless communications device, in a peer to peer communications system in accordance with various embodiments. The exemplary node is, e.g., one of fixed location wireless node 1 1112, fixed location wireless node 2 1114, fixed location wireless node 3 1116, mobile node 1118 and central controller 1120 of system 1100 of FIG. 11. Operation of the exemplary method starts in step 1202 where the node is powered on and initialized. Operation proceeds from start step 1202 to step 1204. In step 1204 the node determines channel usage by a plurality of peer to peer communications devices, e.g., based on sensed usage of the peer to peer communications devices and/or reported usage from the peer to peer communications devices.

Then, in step 1206, the node selects at least one channel for use as a peer discovery channel, said selecting being performed as a function of the number of peer to peer devices already using individual channels for peer discovery. Step 1206 includes step 1014 and, in various embodiments, includes one or more of steps 1208, 1210 and 1212.

In step 1208 the node biases the selection process to prefer channels having higher peer discovery use than channel having lower peer discovery use. In some embodiments, the number of peer to peer devices already using individual channels for peer discovery indicates the number of peer to peer devices, in communications range of a first node for which said selecting is being performed, that are already using individual channels for peer discovery. In various embodiments nodes may, and sometimes do, report location information, e.g., their own location and/or the location of other devices detected in their vicinity. In some embodiments, nodes may, and sometimes do, report communications range information, e.g., their own communications range and/or communications range corresponding to other devices in their vicinity. In some embodiments, signal strength measurements are reported by one or more nodes to the node making the selection of the at least one channel to use for peer discovery. Reported, measured, and/or detected device location information and/or device range information may be, and sometimes is, used by the node making the selection of the at least one channel to use for peer discovery.

In step 1210 the node performs said selection as a function of interference, said selecting as a function of interference including excluding channels having an interference over a threshold level, e.g., a predetermined threshold level. In some embodiments, the selecting at least one channel to use for peer discovery is performed on a geographic basis for each of a plurality of different geographic regions. In step 1212 the node performs said selecting on a geographic basis for each of a plurality of different geographic areas, the at least one channel that is selected for a particular geographic area being selected based on the number of devices in the geographic area which reported the channel to be available and channel usage for the particular geographic area. In some embodiments, at least one channel available to devices in both of two adjacent geographic areas is selected in addition to a channel which has the highest peer discovery usage in the geographic areas. In step 1214, the node selects a set of N channels to be used for peer discovery signaling, said set of N channels including enough channels such that each device providing channel usage information has at least one channel in the set of N channels. In various embodiments, step 1206 many include a combination of one or more of all of steps 1208, 1210, 1212, and 1214. In the same embodiment, at different times, e.g., different passes through the flowchart step 1206 may, and for some embodiments does, include a different combination of one or more of all of steps 1208, 1210, 1212, and 1214.

Step 1216 and step 1226, are optional steps, which are performed in some embodiments, and omitted in other embodiments. Operation of the flowchart shall be described for embodiments in which steps 1216 and 1226 are included. In embodiments, in which 1216 and 1226 are omitted, the steps are bypassed.

Operation proceeds from step 1206 to step 1216. In step 1216 the node selects an additional channel to be used for peer discovery. Step 1216 includes steps 1218, 1220 and 1222. In step 1218, the node identifies communications channels which are available for peer discovery use, and in step 1220 the node orders the channels identified as being available for use according to a predetermined ordering scheme. Then in step 1222 the node selects a first one of said ordered channels to be used for peer discovery signaling, said selecting being performed based on the channel ordering and without regard to channel usage. Operation proceeds from step 1216 to step 1224, in which the node communicates to the peer to peer devices the selected set of N channels to be used for peer discovery. Operation proceeds from step 1224 to step 1226 in which the node communicates to the peer to peer devices the selected additional channel to be used for peer discovery. In some embodiments, steps 1224 and 1226 are performed jointly, e.g., a signal conveys information identifying both the set of N channels and the additional channel. Operation proceeds from step 1226 to step 1204, where the node determines channel usage at later point in time.

Figure 13:
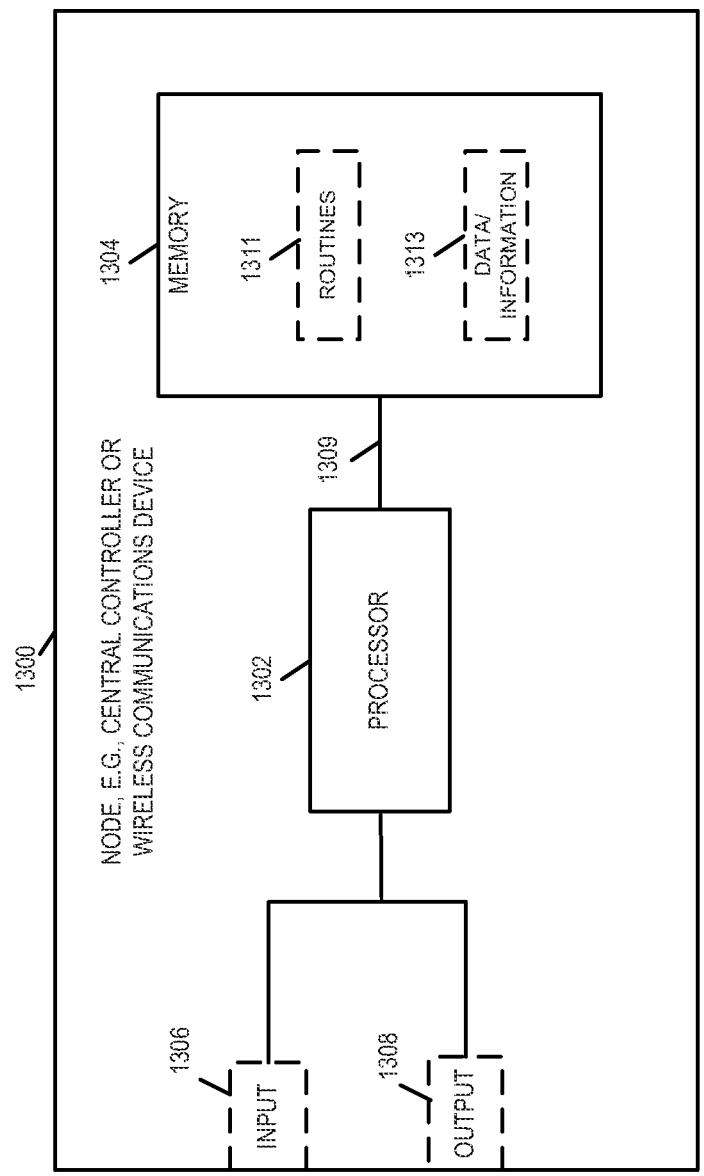
FIG. 13 is a drawing of an exemplary node, e.g., a central controller or individual wireless device, in a peer to peer communications system in accordance with an exemplary embodiment.

FIG. 13 is a drawing of an exemplary node 1300, e.g., a central controller or individual wireless device, in a peer to peer communications system in accordance with an exemplary embodiment. Exemplary node 1300 is, e.g., one of fixed location wireless node 1 1112, fixed location wireless node 2 1114, fixed location wireless node 3 1116, mobile node 1118 and central controller 1120 of peer to peer wireless communications system 1100 of FIG. 11. Exemplary node 1300 may, and sometimes does, implement a method in accordance with flowchart 1200 of FIG. 12.

Node 1300 includes a processor 1302 and memory 1304 coupled together via a bus 1309 over which the various elements (1302, 1304) may interchange data and information. Node 1300 further includes an input module 1306 and an output module 1308 which may be coupled to processor 1302 as shown. However, in some embodiments, the input module 1306 and output module 1308 are located internal to the processor 1302. Input module 1306 can receive input signals. Input module 1306 can, and in some embodiments does, include a wireless receiver and/or a wired or optical input interface for receiving input. Output module 1308 may include, and in some embodiments does include, a wireless transmitter and/or a wired or optical output interface for transmitting output. In some embodiments, memory 1304 includes routines 1311 and data/information 1313.

In various embodiments, processor 1302 is configured to: determine channel usage by a plurality of peer to peer devices, e.g., either sense usage or from reporting of usage from the nodes, said channel usage indicating usage or one or more channels for peer discovery; and select at least one channel for use as a peer discovery channel, said selecting being performed as a function of the number of peer to peer devices already using individual channels for peer discovery.

In some embodiments, processor 1302 is configured to bias said selection process to prefer channels having higher peer discovery use than channels having lower peer discovery use, as part of being configured to select at least one channel for use as a peer discovery channel. In various embodiments, processor 1302 is configured to select at least one channel as a function of interference, said selecting as a function of interference including excluding channels having an interference over a threshold level, as part of being configured to select at least one channel for uses as a peer discovery channel.

In various embodiments, the number of peer to peer devices already using individual channels for peer discovery indicates the number of peer to peer devices, in communications range of a first node for which said selecting is performed, that are already using the individual channels for peer discovery. In some embodiments, nodes may report location information and/or communication range information may be determined from signal strength measurements reported by one or more nodes to the node making the selection.

In various embodiments, processor 1302 is configured to select a set of N channels to be used for peer discovery signaling, as part of being configured to select at least one channel for use as a peer discovery channel. In some such embodiments, the set said set of N channels includes enough channels such that each device providing channel usage information has at least one channel in the set of N channels. In some embodiments, processor 1302 is further configured to communicate to peer to peer devices the selected set of N channels to be used for peer discovery.

Processor 1302, in some embodiments, is configured to select at least one channel for each of a plurality of different geographic areas, as part of being configured to select at least one channel to use as a peer discovery channel. Processor 1302 is configured, in various embodiments, to perform said selecting on a geographic basis for each of a plurality of different geographic areas, as part of being configured to select at least one channel for use as a peer discovery channel. In some such embodiments, the at least one channel that is selected for a particular geographic area is selected based on the number of devices in the geographic area which reported the channel to be available and the channel usage for the particular geographic area.

In various embodiments, processor 1302 is configured to select as least one channel available to devices in both of two adjacent geographic areas in addition to a channel which has the highest peer discovery usage in the geographic areas, as part of being configured to select at least one channel for use as a peer discovery channel.

Processor 1302 is further configured, in some embodiments, to select an additional channel to be used for peer discovery. In some such embodiments, processor 1302 is configured to: (i) identify communications channels which are available for peer discovery use; (ii) order the channels identified as being available for use according to a predetermined ordering scheme; and (iii) select a first one of said ordered channels to be used for peer discovery signaling, said selecting of an additional channel being performed based on the channel ordering and without regard to channel usage, as part of being configured to select an additional channel to be used for peer discovery.

Figure 14:
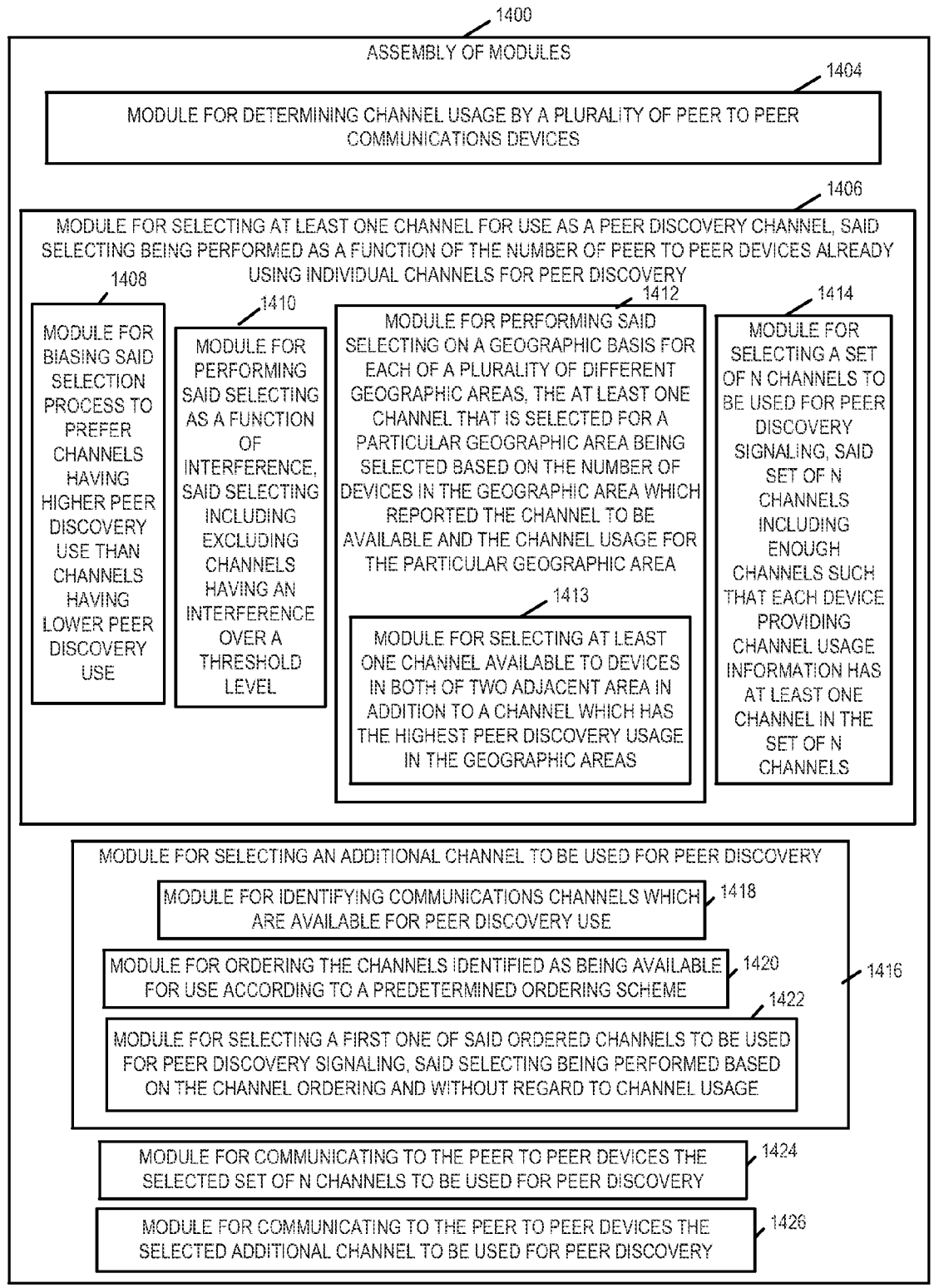
FIG. 14 is an assembly of modules which can, and in some embodiments is, used in the exemplary node of FIG. 13.

FIG. 14 is an assembly of modules 1400 which can, and in some embodiments is, used in the exemplary node 1300 illustrated in FIG. 13. The modules in the assembly 1300 can be implemented in hardware within the processor 1302 of FIG. 13, e.g., as individual circuits. Alternatively, the modules may be implemented in software and stored in the memory 1304 of node 1300 shown in FIG. 13. In some such embodiments, the assembly of modules 1400 is included in routines 1311 of memory 1304 of device 1300 of FIG. 13. While shown in the FIG. 13 embodiment as a single processor, e.g., computer, it should be appreciated that the processor 1302 may be implemented as one or more processors, e.g., computers. When implemented in software the modules include code, which when executed by the processor, configure the processor, e.g., computer, 1302 to implement the function corresponding to the module. In some embodiments, processor 1302 is configured to implement each of the modules of the assembly of modules 1400. In embodiments where the assembly of modules 1400 is stored in the memory 1304, the memory 1304 is a computer program product comprising a computer readable medium, e.g., a non-transitory computer readable medium, comprising code, e.g., individual code for each module, for causing at least one computer, e.g., processor 1302, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 14 control and/or configure the node 1300 or elements therein such as the processor 1302, to perform the functions of the corresponding steps illustrated and/or described in the method of flowchart 1200 of FIG. 12.

Assembly of modules 1400 includes a module 1404 for determining channel usage by a plurality of peer to peer communications devices, a module 1406 for selecting at least one channel for use as a peer discovery channel, said selecting being performed as a function of the number of peer to peer devices already using individual channels for peer discovery, a module 1416 for selecting an additional channel to be used for peer discovery, a module 1424 for communicating to the peer to peer devices the selected set of N channels to be used for peer discovery and a module 1426 for communicating to the peer to peer devices the selected additional channel to be used for peer discovery. Module 1406 includes a module 1408 for biasing said selection process to prefer channels having higher peer discovery use than channels having lower peer discovery use, a module 1410 for performing said selecting as a function of interference, said selecting including excluding channels having an interference over a threshold level, a module 1412 for performing said selecting on a geographic basis for each of a plurality of different geographic areas, the at least one channel that is selected for a particular geographic area being selected based on the number of devices in the geographic area which reported the channel to be available and the channel usage for the particular geographic area, and a module 1414 for selecting a set of N channels to be used for peer discovery signaling, said set of N channels including enough channels such that each device providing channel usage information has at least one channel in the set of N channels. Module 1412 includes a module 1413 for selecting at least one channel available to devices in both of two adjacent areas in addition to a channel which has the highest peer discovery usage in the geographic areas.

Module 1416 includes a module 1418 for identifying communications channels which are available for peer discovery use, a module 1420 for ordering the channels identified as being available for use according to a predetermined ordering scheme and a module 1422 for selecting a first one of said ordered channels to be used for peer discovery signaling, said selecting being performed based on the channel ordering and without regard to channel usage.

Various aspects and features included in some, but not necessarily all embodiments are described below. In some embodiments, a method is used to discover neighbors in a multi-point network operating over unlicensed bands or over TV whitespace. In some embodiments, a channel selection overlay operates on top of a peer-discovery algorithm designed for single-channel operation, in order to tackle problems encountered when operating in an unlicensed band/ white space band.

One approach is to run single-channel peer-discovery algorithms on each of the possible channels; however, this is wasteful of resources, which may make this kind of deployment impractical and/o inefficient. In various embodiments, the approach used performs careful channel selection, which enables efficient usage of available spectrum and power. Various embodiments include methods and apparatus related to channel selection as part of operating a peer-to-peer network, e.g., in either the TV white space spectrum or general unlicensed spectrum, like, e.g., the 900 MHz or 2.4 GHz frequency bands.

Exemplary methods for neighbor discovery fall under two broad categories: (i) centralized or network assisted methods and (ii) decentralized methods. In some centralized or network assisted methods, the network nodes communicate to a central server and provide the central server with information about the local operating conditions, and the central server, which has acquired global knowledge, selects a set of channels for the terminals to utilize. The set of channels for the terminals to use for neighbor discovery signaling, in some embodiment, includes multiple channels. The set of channels for the terminals to use for neighbor discovery signaling, in some embodiments, can be, and sometimes is a single channel. This information, e.g., information identifying the channel or channels to use for neighbor discovery signaling, is communicated back to the network nodes. In some embodiments, in different geographic regions different channels are selected to be used for neighbor discovery signaling. In various embodiments, channel selection information reported to the network nodes from the central server, is communicated to the terminals via a broadcast signal.

In some embodiments which use a decentralized approach, each terminal relies on local information to decide on which channels to use for communications. Different terminals, can and sometimes do, select to use different channels for neighbor discovery, e.g., as a function of interference, detected activity, channel loading, and/or group membership information. The terminals can learn and adjust their channel selection decisions.

Some embodiments implement a method for channel selection and neighbor discovery over unlicensed bands and/ or TV white space channels which uses a centralized approach. Some centralized approach embodiments include measurements performed by each of the network terminals, measurements reports sent to the centralized server, and methods implemented by the central server for channel selection.

Some embodiments implement a decentralized method for channel selection and neighbor discovery over unlicensed bands, or TV white space channels. Some decentralized approach embodiments includes measurements performed by each of the network terminals, methods to disseminate local measurements to neighboring terminals, methods to decide on channel selection based on terminal measurements and measurements fused from neighbor terminals.

Some exemplary embodiments use architectures which can be used for performing peer discovery on multiple channels while using a single RF front end.

Various exemplary centralized methods will be described. In this category of methods, in some embodiments, the wireless devices, sometimes referred to as "white space devices" perform some measurements and feed back these measurements to a central server or a fusion center. The central server, in some embodiments, is accessed as an Internet application. A wireless device discovers similar devices in the same region. The wireless device is sometimes called a white space device since in one embodiment the wireless devices operate in the TV white space. In other embodiments the wireless devices could operate in a general unlicensed frequency band, e.g. 900 MHz or 2.4 GHz. In the following description the term "white space device" is used for both wireless devices that operate in the TV white space and to wireless devices operating in an unlicensed frequency band.

Measurements performed by the white space devices and information provided to the centralized server include but are not limited to the following: channel availability information, channel quality indicators, the location of the white space device, base station ID, Wi-Fi access point ID, interference measurements on the set of available channels, and history on the channel or channels used at a location by the device.

In some embodiments, channel availability information is obtained and/or provided to a centralized server. Channel availability information, in some embodiments, indicates whether or not any primary users of the spectrum, e.g. TV broadcast or wireless microphone, are using the channel in this region. Channel availability information, in some embodiments, is obtained from one or more of: sensing the spectrum, through a geolocation database, or through a beacon transmitted by other transmitters indicating the white space availability in this area. In some embodiments, the geolocation database is hosted on the centralized server, in which case, the channel availability information may not be transmitted back to the server. In some embodiments, the central server accesses the geolocation database.

In some embodiments, channel quality indicators are obtained and/or reported to a centralized server. Channel quality indicators are obtained, for example, through measuring the quality of a pilot or a beacon signal or tracking and/or counting ACKs/NACKs which indicates packet error probability.

In some embodiments the location of the white space device is determined and/or reported to a centralized server. In some embodiments, if a white space device is connected to a cellular network, it can, and in some embodiments does, feedback its base station ID to a centralized server. In some embodiments, if the device is connected to a WLAN network, it can, and in some embodiments does, feedback the Wi-Fi access point ID to a centralized server.

In some embodiments, a device performs interference measurements on the set of available channels. In some such embodiments, the interference measurements or interference information derived from the measurements are reported to a centralized server. The information can be either hard information such as information indicating that the interference is higher than some threshold, or soft information. Different examples for soft information include: a quantized interference value or a function of the interference to noise ratio, e.g. log (Interference/Noise).

In some embodiments, the history of channel(s) used in a location by the device is tracked and/or reported back to a centralized server.

The white space devices, in some embodiments, autonomously perform these measurements and send either the measurements directly or send some function of the measurements back to the central server. In some embodiments, the white space device can be, and sometimes is, triggered by the central server to provide these measurements.

The white space device, in some embodiments, periodically reports information to the central server. The sequence of measurements performed by the white space device can be, and sometimes is, filtered before feeding it back to the server. For example, an IIR filter is used, in some embodiments, to filter the data.

In addition, the white space device, in some embodiments, also sends information and/or a function of the information obtained from other white space devices in the network. In some embodiments, at least some white space devices in the network, broadcast information about themselves and others in the network. The broadcast information may include, e.g., some or all of the different types of measurements listed above. Thus one white space device, in some embodiments, may report information, received from or base on information from another white space device, to a central server.

The white space devices, in some embodiments, periodically measure and report this information. Repeating the measurements, in some embodiments, may be, and sometimes is triggered by an external event. Exemplary external events triggering repeating of measurements, include: (i) the number of neighbors discovered has dropped below some threshold, (ii) the available channel list has changed because new primary user activity has been detected, (iii) the interference conditions measured at the white space device has changed; and (iv) mobility of the white space device.

Various exemplary centralized methods will now be described. In some embodiments, the server collects information from each of the white space devices which have reported their measurements to the server. The server then selects a set of channels n for the white space devices to use in their neighbor discovery. The server takes into account that neighbor clusters of white space devices could share at least one channel to facilitate easy transition for devices moving from one area to another and to maintain connectivity.

One exemplary method that can be used to select the set of channels for the white space devices is called a greedy channel allocation method. The server, uses the information received from the various terminals, to construct a connectivity table, e.g., a required connectivity table, denoting which device should be able to discover which other devices or which devices need to discover which other devices.

In one embodiment, this table is a square matrix of size equal to the number of users, and the entry (i,j) denotes whether user-i and user-j are to have at least one channel in common. There are various ways in which such connectivity specifications can be structured.

For example, it may be desirable that any two devices within a certain distance of each other should discover each other, and the table may be constructed to meet this objective. As another example, it may be desirable that any two devices that are within a certain path loss, e.g., calculated using some measurements forwarded by the devices, should be able to discover each other. As another example, any two users within a geographical cluster, e.g., by association to the same or neighboring base station, or by association to the same Wi-Fi access point, should be able to discover each other. As still another example, it may be desired that a device be able to discover each of the other devices for which there is high enough signal-to-interference-plus-noise ratio on some common free channel.

The table can be, and in some embodiments is, further edited based on the practicality of the connectivity. For example, if the two devices are to be connected, in accordance with the connectivity table, but there are no free channels in common to the two users; then such connectivity specification can be dropped, since no allocation method will be able to satisfy this objective.

For each device, the server then allocates a subset of its free channels to each user such that the connectivity table is satisfied. The subset can be greedily modified by an iterative method in the server which adds or removes a channel to a current channel allocation list for each user, while at the same time connectivity goals are met. In some embodiments, the connectivity goals may not be met during each of the iterations of the method; rather the goals are intended to be met at the end of the multiple iterations.

In one particular embodiment, the method starts its iteration by allocating each user each of its free channels and then starts removing channels for users. For example, channels may be, and sometimes are, selected for removal in some deterministic or random order. In some embodiments, the removal of channels is based on the channel quality. Channel quality is measured, e.g., by the amount of interference, based on the number of ACK/NACK, on the potential for neighbor discovery, e.g., how many neighbors can be discovered on this channel, or a combination thereof, as long as the connectivity constraints are not violated.

In another embodiment, the method starts its iteration by allocating the null set to each user, and adds channels one by one based on the channel quality to the point that the connectivity objectives start getting satisfied.

In some embodiments, the method can be a combination of the two descriptions above, where the channel allocation set is grown and decreased either in a random or a deterministic manner. In particular, the server can run some form of the combinatorial method called simulated annealing. In some embodiments, there is an optimization function, which is a function of the channel allocation to each user. This could, for example, represent the potential for peer discovery including how many users can discover each other under the channel allocation, a combined metric of channel quality allocated to each user, or a function of the number of channels allocated to the white space devices.

Another exemplary method that can be used to select the set of channels for the white space devices is called a geographic region based channel allocation method. In some such embodiments, a geographical region, e.g., the whole geographic region in which the white space devices are operating, is partitioned into geographical clusters, and channel selection is done separately for each cluster.

For each cluster location, n channels are selected. Depending upon the particular embodiment different criteria may be used to select the n channels. Some exemplary criteria include: (i) count the number of terminals having a channel free and select the n channels which have the maximum number of terminals finding them free, (ii) select the n channels with minimum interference, (iii) select the n channels based on a combined metric of interference and channel availability, (iv) select the n channels based on the level of graph connectivity, e.g., n channels achieving the best combination of connectivity, (v) select the first n channels alphabetically, (vi) select the n channels based on at least one of channel availability, interference, and graph connectivity, where a tie is broken based on alphabetically using channel names, and (vii) another optimization criteria such as power considerations.

One or more of the following refinements may be, and sometimes are, used in various methods. The channel selection method, in some embodiments, has some memory, whereby it does not use the instantaneous reported value by the white space device, but rather uses a function of the past measurement values forwarded by the device. Channel selection may be, and sometimes is, refined based on one or more of: users updating their information, users joining and leaving the system, and users' mobility. Alphabetic order, in some embodiments, is changed in a pseudo-random manner. Multiple channels, in some embodiments, are used for interference diversity. Multiple time slots, in some embodiments, are used to average interference burstiness.

Various exemplary decentralized methods will now be described. In the decentralized approaches there is no centralized server controlling channel selection. Each white space device selects its own channel or channels of operation. The choice of the channel or channels is based on measurements of possible channels. Measurements are made at the white space device. In various embodiments, the selection of the channel or channels of operation, e.g., to use for discovery, is made by the white space device as a function of the information obtained from the measurements.

In some embodiments, one or more or all of the following types of information are obtained, e.g., based on measurements and/or received information, by a white space device: channel availability information, channel quality indicators, the location of the white space device, its base station ID, Wi-Fi access point ID, interference information, history of a channel, and the number of neighbor white space devices discovered on each channel. Channel availability information includes information identifying whether or not a primary user or users, e.g. a TV broadcast or wireless microphone, is using the channel in this region. Channel availability information is obtained from one or more or all of: sensing the spectrum, through a geolocation database, or through a beacon transmitted by other transmitters indicating the white space availability in this area. Channel quality indicators, are obtained, for example, through measuring the quality of a pilot or a beacon signal, or tracking or counting ACKs/NACKs which indicate packet error probability information. The location of the white space device, in some embodiments, is determined from measurements by the white space device and/or in collaboration with measurements from other white space devices and/or by device location information communicated from a location determination server to the white space device. If the device is connected to a cellular network, in some embodiments, its base station ID is obtained, e.g., based on a signal received from the base station. If the device is connected to a WLAN network, in some embodiments, the Wi-Fi access point ID is obtained, e.g., based on a signal received from the Wi-Fi access point. In some embodiments, interference measurements on the set of available channels are obtained. This interference information could be either hard information such as information indicating that the interference is higher than some threshold, or soft information. Different examples for soft information include: a quantized interference value, or a function of the interference to noise ratio, e.g. log(Interference/Noise). In some embodiments, history of channel usage in this location is tracked and/or obtained. In some embodiments, the white space device counts the number of neighbor white space devices discovered on each channel.

In some embodiments, a white space device periodically measures, processes information and reports information. In some embodiments, reporting information includes broadcasting information intended to be heard by other white space devices in the vicinity. In some embodiments, repeating the measurements can also be, and sometimes is triggered by an external event. Exemplary external events include: (i) the number of neighbors discovered has dropped below some threshold; (ii) the available channel list has changed because new primary user activity has been detected; (iii) the interference conditions measured at the white space device has changed; and (iv) mobility of the white space device has occurred.

Various exemplary decentralized methods for channel selection will now be described. In one approach the first n channels are selected in alphabetic order. After collecting the measurements, the device selects the first n channels in alphabetic order, i.e. either numerical order or another predefined ordering. The number n, in some embodiments, is a fixed parameter. In some embodiments, the number n depends on complexity/performance tradeoff considerations of the particular embodiment. Higher values of n increase the probability of discovering other neighbors but increase delay and overhead. The number n, in some embodiments, is an adaptive parameter that the device configures based on one or more of: (i) the available number of channels, (ii) interference conditions, and (iii) the number of neighbors discovered.

In another approach the device selects the first n channels in alphabetic order and change the alphabetic order in a pseudo-random manner, e.g., with different orderings being used at different times in a predetermined timing structure. In some such embodiments, the method is the same as the alphabetical order method described above; however, each of the devices re-order the available channel list according to some pseudo-random code that is common to each of the devices. In some such embodiments, this procedure is repeated periodically, e.g., in accordance with a peer to peer recurring timing structure.

In another approach the device selects the best n channels according to channel quality. Channel quality, in some embodiments is indicated as a measure of one or more or all of: interference on each channel, counts of ACK/NACK messages, and ratios of ACKs to NACKS.

In another approach the device selects best $n_1$ channels according to channel quality and the first $n_2$ channels, after removing the already chosen $n_1$ channels from consideration. This is a hybrid of the two methods described above, where the device selects the first n1 channels according to alphabetic order and the best n2 channels according to channel quality.

In yet another approach the device selects first $n_1$ channels after removing a certain fraction or fixed number of channels with worst channel quality. Channel quality indicators such as interference on a channel or ACK/NACK messages, e.g., counts of ACKs and/or counts of NACKs, can be used in determining which channels have the worst channel quality.

In yet another approach a Markovian based method is used. In this method, the device selects a channel or a set of channels to do peer discovery at each time based on the previous channels used and the history of the measurements, including but not limited to: channel availability, channel quality indicators, location of the device, a base station ID, a Wi-Fi access point ID, interference measurements on the set of available channels, history of the channel used in this location, and the number of white space devices discovered on each channel.

The channel selected at the next time instant, in some embodiments, is randomized with a certain probability distribution based on the previous channels selected and the history of measurements.

In one embodiment of this method, the set of channels chosen for the next time are the ones that have the highest value of a certain metric for that set of channels. In some such embodiments, the metric is a function of the number of peers detected on those channels and a function of the history of measurements on those channels.

In another embodiment of the method, the set of channels chosen for the next time is randomly chosen and the probability that a set D is chosen is a function of a certain metric for that set of channels. In some such embodiments, the metric is a function of the number of peers detected on those channels and a function of the history of measurements on those channels.

For example, the set of channels D can be used in the next time with probability proportional to the number of peers detected in this set of channels during the past few time instants; and inversely proportional to the number of interference on these channels.

In yet another approach a Markovian method is used with message passing. Each device broadcasts a subset or a function of its measurements information, and potentially also a function of the information transmitted by some or all of its neighbors. The broadcasted message, in some embodiments, explicitly includes measured information, e.g., channel availability information, channel quality indicators, device location information, base station ID if connected to a cellular base station, Wi-Fi access point ID if connected to a WLAN network, interference measurements on the set of available channels, history of channel usage at the location, number of other devices discovered on each channel. In some embodiments, the broadcasted message communicates measured information or information derived from measured information which has been fused into a single or few functions to reduce overhead. In some embodiments, the communicated information is based on its own measurements, after suitable temporal processing, for example, filtering. In some embodiments, communicated information can be, and sometimes is, based on the measurements transmitted by several of the neighbors, for example, from white space devices that are within a fixed number of hops, or within a fixed range, or sharing the same set of channels.

In various embodiments, the broadcast message is transmitted at a low rate to insure long-range penetration. In some embodiments, if a neighbor is discovered, its broadcast message is decoded if possible. In some embodiments, the method is the same as the Markovian method, except that now the information received from the neighbors can also be used in order to construct the metric for a given set of channels.

One specific exemplary message passing method is described below in more detail which is a Markovian method with message passing. The information received from neighbors discovered are processed to select the n channels that satisfy some criteria.

In one embodiment the n channels are the n channels with the highest number of peers. For example, choose the n channels that have maximum number of peers who have that channel free.

In another embodiment, the selected n channels include $n_1$ channels+$n_2$ channels. For example, choose $n_1$ channels that have maximum number of peers that have that channel free, and choose the first $n_2$ channels in an ordered sequence, after removing the already chosen channels from consideration.

In another embodiment, the n channels selected are the channels with the highest channel quality. Channel quality is, e.g., a function of the measurements observed by the whitespace device and the measurements forwarded from other white space devices. In another embodiment, the n channels are selected as a function of combined measure of number of neighbors and interference seen.

In yet another embodiment, a white space device chooses the channel set of n channels such that the set includes the first channel that it has available in common with every neighbor discovered. This approach can lead to different users selecting channel sets of different sizes. However, in some embodiments, the set is trimmed to a given size, e.g., a first predetermined size, and/or controlled to be greater than a certain size, e.g., a second predetermined size, by using a metric for the set of channels which is a combination of the measurement made by the device and the measurements received from other white space devices.

To handle dynamics, in some embodiments, the white space device periodically or at randomly chosen time slots performs peer discovery operations on one or several or all of its free channels. For example, in one embodiment, the white space device can periodically perform peer discovery in each of the channels which are alphabetically before the channels on which it is routinely performing peer discovery.

FIG. 15 is a flowchart 1500 of an exemplary method of operating a wireless communications device, e.g., a mobile node supporting peer to peer communications, to perform an exemplary method. Operation starts in step 1502 where the wireless communications device is powered on and initialized. Operation proceeds from start step 1502 to step 1504 where the wireless communications device performs peer discovery operations on each of the free channels, e.g., on the channels that it considers to be available for peer discovery signaling from its perspective. Peer discovery operations may, and sometimes do, include both transmitting peer discovery information and receiving peer discovery information. As part of peer discovery the wireless communications device discovers what neighbors are in its vicinity and receives information from the discovered neighbors, e.g., messages from neighbors communicating information that can be used to make a selection of which channel or channels to use for peer discovery, e.g., from among a plurality of alternative channels. Operation proceeds from step 1504 to step 1506. In step 1506 the wireless communications device arranges channels by the number of peers for which that channel is available, e.g., based on the received discovery information from the neighbors. Operation proceeds from step 1506 to step 1508.

In step 1508 the wireless communications device selects the 2 channels, which are considered to be free channels by the highest number of peers, to use for peer discovery. In other embodiments, a different number of channels is selected, e.g., a different predetermined number of channels. In some embodiments, the number of channels selected to be used for peer discovery may, and sometimes does vary, e.g., as a function of conditions.

Operation proceeds from step 1508 to step 1510. In step 1510 the wireless communications device performs peer discovery operation on the two selected channels. Operation proceeds from step 1510 to step 1512. In step 1512 the wireless communications device determines whether or not to perform peer discovery operations on additional channels in addition to the two selected channels during this iteration. In some embodiments, the wireless communications device periodically or at pseudo-randomly chosen time slots does peer discovery on an additional channel or channels.

If the wireless communications device decides that it is not to perform peer discovery on additional channels at this time, then operation proceeds from step 1512 to step 1510 where the wireless communications device performs peer discovery on the two selected channels. However, if the wireless communications device decides that it is to perform peer discovery on additional channel during this iteration, then operation proceeds from step 1512 to step 1514. In step 1514 the wireless communications device performs peer discovery operation on the two selected channels and one or more additional channels. Operation proceeds from step 1514 to step 1506.

FIG. 16 is a drawing of an exemplary wireless communications device 1600 in accordance with an exemplary embodiment. Exemplary wireless communications device 1600 is, e.g., one of the wireless communications devices of system 100 of FIG. 1. Exemplary wireless communications device 1600 may, and sometimes does, implement a method in accordance with flowchart 1500 of FIG. 15.

Wireless communications device 1600 includes a processor 1602 and memory 1604 coupled together via a bus 1609 over which the various elements (1602, 1604) may interchange data and information. Wireless device 1600 further includes an input module 1606 and an output module 1608 which may be coupled to processor 1602 as shown. However, in some embodiments, the input module 1606 and output module 1608 are located internal to the processor 1602. Input module 1606 can receive input signals. Input module 1606 can, and in some embodiments does, include a wireless receiver and/or a wired or optical input interface for receiving input. Output module 1608 may include, and in some embodiments does include, a wireless transmitter and/or a wired or optical output interface for transmitting output. In some embodiments, memory 1604 includes routines 1611 and data/information 1613.

FIG. 17 is an assembly of modules 1700 which can, and in some embodiments is, used in the exemplary wireless communications device 1600 illustrated in FIG. 16. The modules in the assembly 1700 can be implemented in hardware within the processor 1602 of FIG. 16, e.g., as individual circuits. Alternatively, the modules may be implemented in software and stored in the memory 1604 of wireless communications device 1600 shown in FIG. 16. In some such embodiments, the assembly of modules 1700 is included in routines 1611 of memory 1604 of device 1600 of FIG. 16. While shown in the FIG. 16 embodiment as a single processor, e.g., computer, it should be appreciated that the processor 1602 may be implemented as one or more processors, e.g., computers. When implemented in software the modules include code, which when executed by the processor, configure the processor, e.g., computer, 1602 to implement the function corresponding to the module. In some embodiments, processor 1602 is configured to implement each of the modules of the assembly of modules 1700. In embodiments where the assembly of modules 1700 is stored in the memory 1604, the memory 1604 is a computer program product comprising a computer readable medium, e.g., a non-transitory computer readable medium, comprising code, e.g., individual code for each module, for causing at least one computer, e.g., processor 1602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 17 control and/or configure the wireless communications device 1600 or elements therein such as the processor 1602, to perform the functions of the corresponding steps illustrated and/or described in the method of flowchart 1500 of FIG. 15.

Assembly of modules 1700 includes a module 1704 for performing peer discovery on each of the free channels, a module 1706 for arranging channels by number of peers for which that channel is available, e.g., based on received discovery information, a module 1708 for selecting the 2 channels, which are considered free channels by the highest number of peers, to use for peer discovery. Assembly of modules further includes a module 1710 for performing peer discovery on the two selected channels, a module 1712 for determining whether or not to perform the peer discovery on additional channels for this iteration, and a module 1714 for performing peer discovery on the two selected channels and on one or more addition channels.

In various embodiments a device of any of one or more of FIGS. 1-17 includes a module corresponding to each of the individual steps and/or operations described with regard to any of the Figures in the present application and/or described in the detailed description of the present application. The modules may, and sometimes are implemented in hardware. In other embodiments, the modules may, and sometimes are, implemented as software modules including processor executable instructions which when executed by the processor of the information collection device cause the device to implement the corresponding step or operation. In still other embodiments, some or all of the modules are implemented as a combination of hardware and software.

The techniques of various embodiments may be implemented using software, hardware and/or a combination of software and hardware. Various embodiments are directed to apparatus, e.g., network nodes, mobile nodes such as mobile terminals, access points such as base stations, and/or communications systems. Various embodiments are also directed to methods, e.g., method of controlling and/or operating network nodes, mobile nodes, access points such as base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal reception, signal processing, signal generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as network nodes, access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

Various embodiments are well suited to communications systems using a peer to peer signaling protocol. Some embodiments use an Orthogonal Frequency Division Multiplexing (OFDM) based wireless peer to peer signaling protocol, e.g., WiFi signaling protocol or another OFDM based protocol.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with Code Division Multiple Access (CDMA), OFDM, and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a node in a peer to peer communications system, the method comprising:
   determining channel usage by a plurality of peer to peer devices, said channel usage indicating usage of one or more channels for peer discovery; and
   selecting at least one channel for use as a peer discovery channel, said selecting being performed as a function of the number of peer to peer devices already using individual channels for peer discovery, wherein said selecting is biased to prefer a first channel having a higher number of peer to peer devices already using the first channel for peer discovery over a second channel having a lower number of peer to peer devices already using the second channel for peer discovery.

2. The method of claim 1, wherein selecting at least one channel includes:
   selecting a set of N channels to be used for peer discovery signaling, said set of N channels including enough channels such that each device providing channel usage information has at least one channel in the set of N channels.

3. The method of claim 2, further comprising:
   communicating to peer to peer devices the selected set of N channels to be used for peer discovery.

4. The method of claim 1, wherein selecting at least one channel is performed for each of a plurality of different geographic areas.

5. The method of claim 1, wherein said selecting is performed on a geographic basis for each of a plurality of different geographic areas, the at least one channel that is selected for a particular geographic area being selected based on the number of devices in the geographic area which reported the channel to be available and the channel usage for the particular geographic area.

6. A node in a peer to peer communications system, the node comprising:
   means for determining channel usage by a plurality of peer to peer devices, said channel usage indicating usage of one or more channels for peer discovery; and
   means for selecting at least one channel for use as a peer discovery channel, said selecting being performed as a function of the number of peer to peer devices already using individual channels for peer discovery, wherein said selecting is biased to prefer a first channel having a higher number of peer to peer devices already using the first channel for peer discovery over a second channel having a lower number of peer to peer devices already using the second channel for peer discovery.

7. The node of claim 6, wherein means for selecting at least one channel includes:
   means for selecting a set of N channels to be used for peer discovery signaling, said set of N channels including enough channels such that each device providing channel usage information has at least one channel in the set of N channels.

8. The node of claim 7, further comprising:
   means for communicating to peer to peer devices the selected set of N channels to be used for peer discovery.

9. The node of claim 6, wherein means for selecting at least one channel performs a selection for each of a plurality of different geographic areas.

10. The node of claim 6, wherein said means for selecting at least one channel includes means for selecting on a geographic basis for each of a plurality of different geographic areas, the at least one channel that is selected for a particular geographic area being selected based on the number of devices in the geographic area which reported the channel to be available and the channel usage for the particular geographic area.

11. A computer program product for use in a node, the computer program product comprising:
   a non-transitory computer readable medium comprising:
      code for causing at least one computer to determine channel usage by a plurality of peer to peer devices, said channel usage indicating usage of one or more channels for peer discovery; and
      code for causing said at least one computer to select at least one channel for use as a peer discovery channel, said selecting being performed as a function of the number of peer to peer devices already using individual channels for peer discovery, wherein said selecting is biased to prefer a first channel having a higher number of peer to peer devices already using the first channel for peer discovery over a second channel having a lower number of peer to peer devices already using the second channel for peer discovery.

12. A node comprising:
   at least one processor configured to:
      determine channel usage by a plurality of peer to peer devices, said channel usage indicating usage of one or more channels for peer discovery; and
      select at least one channel for use as a peer discovery channel, said selecting being performed as a function of the number of peer to peer devices already using individual channels for peer discovery, wherein said selecting is biased to prefer a first channel having a higher number of peer to peer devices already using the first channel for peer discovery over a second channel having a lower number of peer to peer devices already using the second channel for peer discovery; and
   memory coupled to said at least one processor.

13. The node of claim 12, wherein said at least one processor is configured to select a set of N channels to be used for peer discovery signaling, said set of N channels including enough channels such that each device providing channel usage information has at least one channel in the set of N channels, as part of being configured to select at least one channel for use as a peer discovery channel.

14. The node of claim 13, wherein said at least one processor is further configured to communicate to peer to peer devices the selected set of N channels to be used for peer discovery.

15. The node of claim 12, wherein said at least one processor is configured to select at least one channel for each of a plurality of different geographic areas, as part of being configured to select at least one channel to use as a peer discovery channel.

* * * * *